(12) United States Patent
Vos et al.

(10) Patent No.: US 11,575,472 B2
(45) Date of Patent: Feb. 7, 2023

(54) METHODS AND APPARATUSES FOR SUPPORTING MULTI TRANSPORT BLOCK GRANT DATA TRANSMISSION

(71) Applicant: Sierra Wireless, Inc., Richmond (CA)

(72) Inventors: Gustav Gerald Vos, Surrey (CA); Recep Serkan Dost, Richmond (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 17/184,151

(22) Filed: Feb. 24, 2021

(65) Prior Publication Data

US 2021/0273751 A1    Sep. 2, 2021

Related U.S. Application Data

(60) Provisional application No. 62/982,423, filed on Feb. 27, 2020.

(51) Int. Cl.
*H04L 1/18* (2006.01)
*H04L 1/06* (2006.01)

(52) U.S. Cl.
CPC .......... *H04L 1/1819* (2013.01); *H04L 1/0643* (2013.01); *H04L 1/1896* (2013.01)

(58) Field of Classification Search
CPC .... H04L 1/1819; H04L 1/0643; H04L 1/1896
See application file for complete search history.

(56) References Cited

U.S. PATENT DOCUMENTS

| | | |
|---|---|---|
| 8,588,142 B2 | 11/2013 | Seo et al. |
| 9,043,666 B2 | 5/2015 | Kotecha et al. |
| 9,706,567 B2 | 7/2017 | Fang et al. |
| 9,907,062 B2 | 2/2018 | McBeath et al. |
| 9,912,504 B2 | 3/2018 | Krzymien et al. |
| 11,381,349 B2 | 7/2022 | Vos et al. |
| 2009/0307554 A1 | 12/2009 | Marinier et al. |
| 2010/0064061 A1 | 3/2010 | Warren et al. |

(Continued)

FOREIGN PATENT DOCUMENTS

| | | |
|---|---|---|
| EP | 3272050 A1 | 1/2018 |
| WO | 2010/039738 A2 | 4/2010 |

(Continued)

OTHER PUBLICATIONS

Technical Specification ETSI TS 136 212 v13.10.0 (Jan. 2020), LTE; Evolved Universal Terrestrial Radio Access (E-UTRA); Multiplexing and channel coding (3GPP TS 36.212 version 13.10.0 Release 13) [Refer Section 5.3].

(Continued)

*Primary Examiner* — Kent Krueger
(74) *Attorney, Agent, or Firm* — Zeman-Mullen & Ford, LLP

(57) ABSTRACT

A method and apparatus for supporting multi transport block grant (MTBG) data transmission in a wireless communication system, such as an LTE system. The method includes increasing the number of hybrid automatic repeat request (HARQ) processes in a HARQ cycle to greater than 8, where the HARQ processes are divided into two or more HARQ process groups. The method further includes specifying a delay indicative of time between the MTBG and commence of the data transmission and another delay indicative of time between the data transmission and acknowledgement (ACK).

20 Claims, 14 Drawing Sheets

(56) References Cited

U.S. PATENT DOCUMENTS

| | | |
|---|---|---|
| 2010/0098006 A1 | 4/2010 | Golitschek Edler Von Elbwart et al. |
| 2010/0251054 A1 | 9/2010 | Cai et al. |
| 2010/0260130 A1 | 10/2010 | Earnshaw et al. |
| 2010/0281486 A1 | 11/2010 | Lu et al. |
| 2011/0122825 A1 | 5/2011 | Lee et al. |
| 2011/0243039 A1 | 10/2011 | Papasakellariou et al. |
| 2011/0300854 A1 | 12/2011 | Shan et al. |
| 2012/0033650 A1 | 2/2012 | Ahn et al. |
| 2012/0195267 A1 | 8/2012 | Dai et al. |
| 2012/0300616 A1 | 11/2012 | Zeng et al. |
| 2013/0235812 A1 | 9/2013 | Heo et al. |
| 2014/0153484 A1 | 6/2014 | Kim et al. |
| 2014/0269452 A1 | 9/2014 | Papasakellariou |
| 2014/0293893 A1 | 10/2014 | Papasakellariou et al. |
| 2014/0321418 A1 | 10/2014 | Rinne et al. |
| 2015/0098370 A1 | 4/2015 | Lee |
| 2015/0098418 A1 | 4/2015 | Vajapeyam et al. |
| 2015/0200751 A1 | 7/2015 | Yin et al. |
| 2015/0264678 A1 | 9/2015 | Yin et al. |
| 2015/0280876 A1 | 10/2015 | You et al. |
| 2015/0305003 A1 | 10/2015 | Chen et al. |
| 2016/0037524 A1 | 2/2016 | Krzymien et al. |
| 2016/0095133 A1 | 3/2016 | Hwang et al. |
| 2016/0338089 A1 | 11/2016 | Vos |
| 2017/0094644 A1 | 3/2017 | Vos |
| 2018/0006791 A1 | 1/2018 | Marinier et al. |
| 2018/0054819 A1* | 2/2018 | Meng .................. H04L 1/1835 |
| 2018/0176945 A1 | 6/2018 | Cao et al. |
| 2018/0234212 A1 | 8/2018 | Park et al. |
| 2018/0254851 A1* | 9/2018 | Roessel ................ H04L 1/1861 |
| 2019/0075589 A1 | 3/2019 | Jeon et al. |
| 2019/0141778 A1 | 5/2019 | Pedersen |
| 2019/0149274 A1 | 5/2019 | Freda et al. |
| 2019/0268930 A1 | 8/2019 | Rudolf et al. |
| 2020/0053750 A1 | 2/2020 | Vos |
| 2020/0053769 A1* | 2/2020 | Vos ....................... H04L 1/0005 |
| 2020/0178288 A1 | 6/2020 | Chang et al. |
| 2020/0389873 A1 | 12/2020 | Liu et al. |
| 2021/0243731 A1* | 8/2021 | Shin ..................... H04L 1/1864 |
| 2021/0274536 A1* | 9/2021 | Shin .................. H04W 72/1257 |

FOREIGN PATENT DOCUMENTS

| | | | |
|---|---|---|---|
| WO | 2011/094926 A1 | 8/2011 | |
| WO | 2017/049413 A1 | 3/2017 | |
| WO | 2017/194822 A1 | 11/2017 | |
| WO | 2018/085717 A1 | 5/2018 | |
| WO | 2020/028993 A1 | 2/2020 | |
| WO | 2020/145652 A1 | 7/2020 | |
| WO | 2020/204376 A1 | 10/2020 | |
| WO | 2021/062551 A1 | 4/2021 | |
| WO | 2021/168564 A1 | 9/2021 | |

OTHER PUBLICATIONS

Technical Specification ETSI TS 136 212 v14.11.0 (Jan. 2020), LTE; Evolved Universal Terrestrial Radio Access (E-UTRA); Multiplexing and channel coding (3GPP TS 36.212 version 14.11.0 Release 14) [Refer Section 5.3].
Technical Specification ETSI TS 136 212 v15.8.0 (Jan. 2020), LTE; Evolved Universal Terrestrial Radio Access (E-UTRA); Multiplexing and channel coding (3GPP TS 36.212 version 15.8.0 Release 15) [Refer Section 5.3].
Technical Specification ETSI TS 138 212 v15.8.0 (Jan. 2020), 5G; NR; Multiplexing and channel coding (3GPP TS 38.212 version 15.8.0 Release 15) [Refer Section 7].
Technical Specification 3GPP TS 36.212 v16.0.0 (Dec. 2019), 3rd Generation Partnership Project; Technical Specification Group Radio Access Network; Evolved Universal Terrestrial Radio Access (E-UTRA); Multiplexing and channel coding (Release 16) [Refer Section 5.3].
Technical Specification 3GPP TS 38.212 v16.0.0 (Dec. 2019), 3rd Generation Partnership Project; Technical Specification Group Radio Access Network; NR; Multiplexing and channel coding (Release 16) [Refer Section 7].
Technical Specification ETSI TS 136 212 v17.1.0 (Apr. 2022), LTE; Evolved Universal Terrestrial Radio Access (E-UTRA); Multiplexing and channel coding (3GPP TS 36.212 version 17.1.0 Release 17) [Refer Section 5.3].
Technical Specification ETSI TS 138 212 v17.2.0 (Jul. 2022), 5G; NR; Multiplexing and channel coding (3GPP TS 38.212 version 17.2.0 Release 17) [Refer Section 7].
Huawei, Scheduling of multiple transport blocks, 3GPP TSG RAN WGI Meeting #99, Reno, USA, Nov. 18-22, 2019, vol. RI-1911919.
International Search Report dated May 7, 2021 for corresponding PCT Application PCT/CA2021/050221.
Written Opinion dated May 7, 2021 for corresponding PCT Application PCT/CA2021/050221.
Office Action dated Nov. 12, 2021 issued in U.S. Appl. No. 17/062,161.
Notice of Allowance dated Mar. 10, 2022 issued in U.S. Appl. No. 17/062,161.
Extended European Search Report dated Apr. 25, 2022 issued in regard to EP19846668.2.
Sierra Wireless, DCI Requirements to Support Time Diversity, 3GPP TSG RAN WG1 Meeting #82bis, Malmo, Sweden Oct. 5-9, 2015, vol. R1-155684, XP051041745, Sep. 25, 2015.
Samsung, Procedures for Grant-Based UL Transmissions, 3GPP TSG RAN WG1 NR Ad-Hoc#2, Qingdao, P.R. China, Jun. 27-30, 2017, vol. R1-1710722, XP051304352, Jun. 16, 2017.
Ericsson, New WID on Rel-16 MTC enhancements for Lte, 3GPP TSG RAN Meeting #80, La Jolla, USA, Jun. 11-14, 2018, vol. RP-181450.
Technical Specification 3GPP TS 36.212 V12.5.0 (Jun. 2015), 3rd Generation Partnership Project; Technical Specification Group Radio Access Network; Evolved Universal Terrestrial Radio Access (E-UTRA); Multiplexing and channel coding (Release 12).
Sierra Wireless, Performance of Time Diversity for PUSCH and HARQ Impacts, 3GPP TSG RAN WG1 Meeting #82, Beijing, China, Aug. 24-28, 2015, vol. R1-154489.
Sierra Wireless, PUSCH Summary RAN#1 80bis, 3GPP TSG RAN WG1 Meeting #80bis, Belgrade, Serbia, Apr. 20-24, 2015, vol. R1-152301.
Sierra Wireless, PUSCH Summary of Submitted Tdocs on RAN#81, 3GPP TSG-RAN WG1 Meeting 81, Fukuoka, May 25-29-2015, vol. R1-153494.
Intel Corporation, Coverage enhancements for M-PDCCH, 3GPP TSG RAN WG1 Meeting #81, Fukuoka, Japan, May 25-29, 2015, vol. R1-152615.
Sony, Performance of M-PDCCH with frequency offset, 3GPP TSG-RAN WG1 Meeting #81, Fukuoka, Japan, May 25-29, 2015, vol. R1-153083.
International Search Report dated Dec. 18, 2020 for corresponding PCT Application PCT/CA2020/051322.
Written Opinion dated Dec. 18, 2020 for Application No. PCT/CA2020/051322.
International Search Report dated Dec. 19, 2016 for Application No. PCT/CA2016/051124.
Written Opinion dated Dec. 19, 2016 for Application No. PCT/CA2016/051124.
International Search Report dated Nov. 7, 2019 for Application No. PCT/CA2019/051095.
Written Opinion dated Nov. 7, 2019 for Application No. PCT/CA2019/051095.
Office Action dated Jul. 20, 2018 issued in U.S. Appl. No. 15/276,053.
Notice of Allowance dated Oct. 29, 2018 issued in U.S. Appl. No. 15/276,053.
Office Action dated Jan. 8, 2021 issued in U.S. Appl. No. 16/536,964.
Office Action dated Apr. 30, 2021 issued in U.S. Appl. No. 16/536,964.
Office Action dated Sep. 15, 2021 issued in U.S. Appl. No. 16/536,964.
Office Action dated Feb. 5, 2021 issued in U.S. Appl. No. 16/537,152.
Office Action dated Jul. 23, 2021 issued in U.S. Appl. No. 16/537,152.
Office Action dated Jan. 6, 2022 issued in U.S. Appl. No. 16/537,152.

\* cited by examiner

METHODS AND APPARATUSES FOR SUPPORTING MULTI TRANSPORT BLOCK GRANT DATA TRANSMISSION

RELATED APPLICATIONS

This application claims the benefit of priority to U.S. Provisional Patent Application No. 62/982,423 entitled "Methods and Apparatuses for Supporting Multi Transport Block Grant Data Transmission in a Wireless Communication System" filed Feb. 27, 2020, the contents of which are incorporated herein by reference in their entirety.

FIELD OF THE INVENTION

The present invention pertains in general to wireless communications, for example following 3GPP standards, and in particular to a method and apparatus for supporting multi transport block grant (MTBG) data transmissions in a wireless communication system.

BACKGROUND

The Long Term Evolution (LTE) wireless communication standard offers a high-capacity, high-speed wireless interface for use by mobile phones, data terminals, machine-type-communication (MTC) or machine-to-machine (M2M) equipment, and the like. However, in some instances it may be desirable to sacrifice aspects of an LTE terminal's performance, for example data transmission speed, in order to gain other benefits, such as reduced complexity and/or cost.

For example, there are specific restrictions to the scheduling that can be used with the $3^{rd}$ Generation Partnership Project (3GPP) half-duplex LTE-machine-type-communication (LTE-M) devices. The restrictions are generally related to time delays imposed during data transmission. These time delays can include: 2 subframes between downlink (DL) grant (sent on MTC physical downlink control channel (MPDCCH)) and the DL data on physical downlink shared channel (PDSCH); 4 subframes between uplink (UL) grant (sent on MPDCCH) and the UL data on physical uplink shared channel (PUSCH); 1 subframe for switching transmission direction (e.g. DL to UL, or UL to DL); 4 subframes between the DL data and the DL data acknowledgement (ACK) (sent on the physical uplink control channel (PUCCH)); 4 subframes between the DL data acknowledgement (ACK) and the next DL grant (sent on MPDCCH) for the same hybrid automatic repeat request (HARQ) process; and 4 subframes between the UL data and the UL data ACK (sent on the MPDCCH).

The above identified restrictions are minimum time delays thus longer time delays are permitted and also often expected. In fact, HARQ scheduling generally requires processing time more than the above identified delays. As such, it is desired to enhance the speed of data transmission.

In the 3GPP specification Release 15 or earlier, multiple transport blocks (TBs) must be scheduled individually. For example, each set of TB repeats occur after a single transport block grant (STBG). Using STBG, there are a lot of unused sub-frames (SF) which slows the data rate and uses a lot of MTC physical downlink control channel (MPDCCH) resources to schedule each grant. On the other hand, allowing multiple TBs using a multi-TB grant (MTBG) will result in more efficient scheduling and thus can enhance the data transmission. However, existing methods for transmitting data using MTBG lead to lower SF utilization which can significantly reduce the data transmission speed.

Therefore there is a need for a method and apparatus for supporting MTBG data transmissions in a wireless communication system, such as long term evolution (LTE), that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for supporting multi transport block grant (MTBG) data transmission in a wireless communication system, such as a 5G or New Radio (NR) system. In accordance with aspects of the present invention, there is provided a method for supporting multi-transport block grant (MTBG) data transmissions in a wireless communication system. The method includes determining a number of hybrid automatic repeat request (HARQ) processes in a HARQ cycle and upon determination that the number of HARQ processes is greater than 8 and the HARQ processes are divided into two or more HARQ process groups, specifying a first delay indicative of time between transmission of a MTBG and commencement of a data transmission. The method further includes specifying a second delay indicative of time between the data transmission and receipt of an acknowledgement (ACK).

In some embodiments, the first delay is explicitly specified in a downlink control information (DCI) transmission. In some embodiments, the second delay is explicitly specified in a downlink control information (DCI) transmission. In some embodiments, the first delay and the second delay are explicitly specified in a downlink control information (DCI) transmission. In some embodiments, a time between the ACK and a next MTBG for a next HARQ cycle is at least in part indicative of a number of HARQ processes in the next HARQ cycle. In some embodiments, the HARQ process group associated with the MTBG is at least in part indicative of the first delay and the second delay.

In accordance with aspects of the present invention, there is provided a user equipment (UE) including a processor and machine readable memory storing machine executable instructions. The instructions, when executed by the processor configure the UE to receive multi-transport block grants (MTBG), the MTBG including information indicative of: 1) a number of hybrid automatic repeat request (HARQ) processes in a HARQ cycle, the HARQ processes being divided into two or more HARQ process groups when the number of HARQ processes is greater than 8; 2) a first delay indicative of time between transmission of a MTBG and commencement of a data transmission; 3) a second delay indicative of time between the data transmission and receipt of an acknowledgement (ACK). The instructions when executed by the processor further configure the UE to transmit data in accordance with the information.

In accordance with aspects of the present invention, there is provided a base station including a processor and a machine readable memory storing instructions. The instructions, when executed by the processor configure the base station to transmit a multi-transport block grant (MTBG), the MTBG including information indicative of 1) a number of hybrid automatic repeat request (HARQ) processes in a HARQ cycle, the HARQ processes being divided into two or more HARQ process groups when the number of HARQ processes is greater than 8; 2) a first delay indicative of time between the MTBG and commencement of a data transmission; 3) a second delay indicative of time between the data transmission and transmission of an acknowledgement (ACK). The instructions when executed by the processor further configure the base station to receive data in accordance with the information.

BRIEF DESCRIPTION OF THE FIGURES

These and other features of the invention will become more apparent in the following detailed description in which reference is made to the appended drawings.

FIG. 3 illustrates SF utilization for STBG DL data transmission with 14 HARQs and ACK bundling.

FIG. 4 illustrates SF utilization for multi transport block grants (MTBG) DL data transmission with 8 HARQs and ACK bundling.

FIG. 12 illustrates mixed DL-UL data transmission using MTBG with variable delay, in accordance with embodiments of the present disclosure.

DETAILED DESCRIPTION OF THE INVENTION

The present disclosure provides methods and apparatuses for supporting data transmissions using multi transport block grant (MTBG) in a wireless communication system, such as a 5G or New Radio (NR) system.

A MTBG typically should be used when more than the maximum single transport block size (TBS) (e.g. 1000 bits) needs to be sent. Since >1000 bits may not always be available, it can be important that both single transport block grant (STBG) and multi-transport block grant (MTBG) being supported dynamically when the MTBG feature is enabled. As such according to some embodiments, the MTBG feature can be configured or enabled by radio resource control (RRC). According to some embodiments, when the MTBG is configured or enabled, both STBG and MTBG are supported. As is known STBG can be used to schedule a single hybrid automatic repeat request (HARQ) process. It will be readily understood that mufti-transport block grant (MTBG) is a feature that can be used to schedule more than 1 HARQ processes.

In general, data transmission speed for haft-duplex (HD) frequency division duplex (FDD) user equipment (UE) can be estimated as given in Equation 1:

$$\text{Speed} = \text{Subframe (SF) Utilization} * \text{Transport Block Size (TBS)} \quad (1)$$

TBS is the maximum number of bits in a transport block (TB). In consideration of Equation 1 presented above, transmission speed can be improved by increasing the TBS. For example, for LTE-M, it was suggested to increase maximum uplink (UL) TBS in Release 14 of the the 3$^{rd}$ Generation Partnership Project (3GPP) specification from 1000 bits to 2984 bits. This TBS increase nearly tripled the peak UL speed compared to the previous peak UL speed. However, the TBS increase also led to a decrease of the code rate thereby limiting effectiveness of higher TBS. Specifically, the higher TBS can only be used in good coverage as such, data transmission speed will not be improved for devices (e.g. UE) in average coverage or in edge coverage. Thus far, the 3GPP standards committees have not suggested an increase of the downlink (DL) TBS as the DL TBS increase may require a larger hybrid automatic repeat request (HARQ) buffer size for combining in the UE.

SF utilization is indicative of the utilization rate for the subframes within a HARQ cycle that can be used for transmitting data on physical data channels like physical uplink shared channel (PUSCH) or PDSCH. SF utilization may be estimated as given in Equation 2:

$$SF \text{ utilization} = \frac{\text{number of } SFs \text{ within a } HARQ \text{ cycle that can be used for data transmission}}{\text{Number of } SFs \text{ within a } HARQ \text{ cycle}} \quad (2)$$

Figure 1:
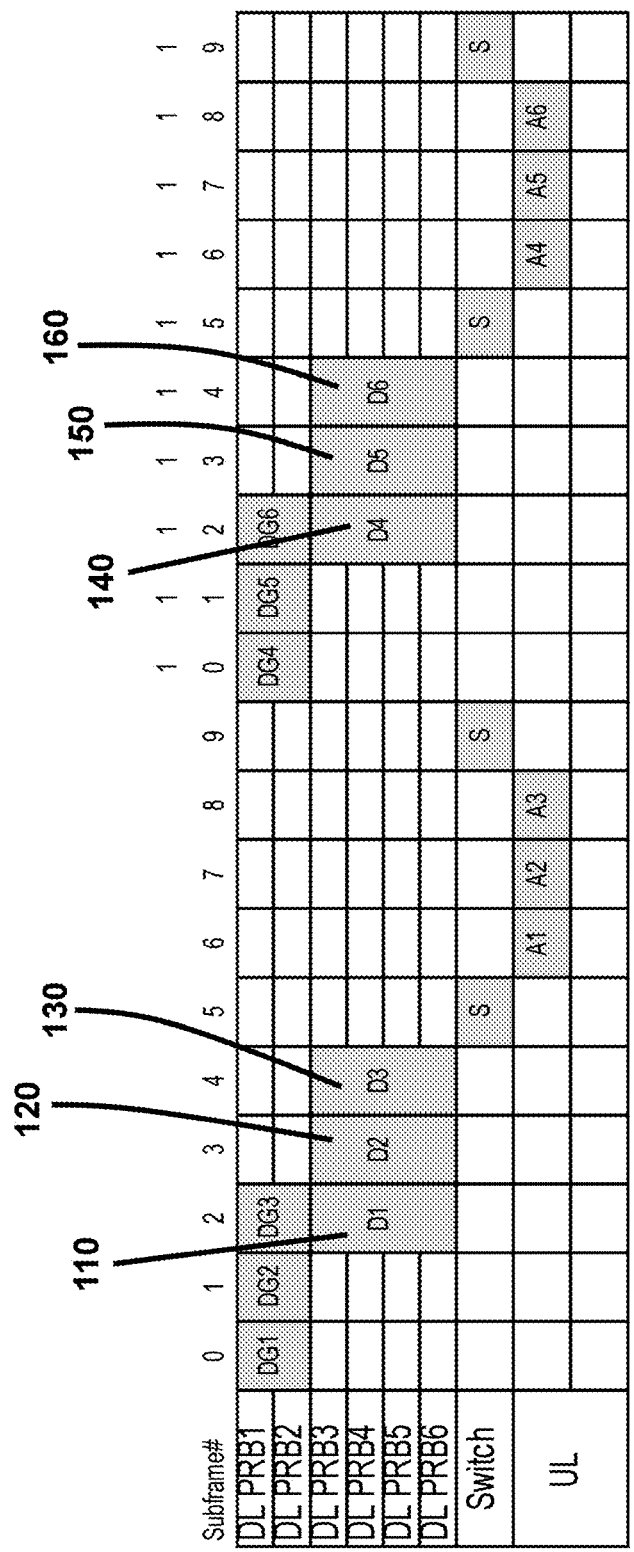
FIG. 1 illustrates subframe (SF) utilization with 3 hybrid automatic repeat requests (HARQs) in an LTE-machine-type-communication (LTE-M) system according to the prior art.

Unlike the TBS increase, an increase in SF utilization will improve data speed for UEs in all coverage levels. SF utilization is normally 100% for full duplex (FD) frequency division duplex (FDD) devices (e.g. FD-FDD UE). However, as illustrated in FIG. 1, the DL SF utilization may be only 30% for HD-FDD devices in Release 13 of the 3GPP specification. This, given a TBS=1000 bits, only renders speeds of 300 kbps for data transmission.

FIG. 1 illustrates SF utilization with three HARQs in an LTE-machine-type-communication (LTE-M) system based on Release 13 of the 3GPP specification. Referring to FIG. 1, subframes 0 to 9 and 10 to 19 may be indicative of initial and subsequent HARQ cycles, respectively. Each of D1 110, D2 120, D3 130, D4 140, D5 150 and D6 160 may represent DL data being transmitted via DL physical resource blocks (PRB) 3, 4, 5 and 6 of physical data channel (e.g. PDSCH). During the first HARQ cycle (i.e. subframes 0 to 9), D1 110, D2 120 and D3 130 only occupy PRBs in subframes 2 to 4. During the subsequent HARQ cycle (i.e. subframes 10 to 19), D4 140, D5 150 and D6 160 only occupy PRBs in subframes 12 to 14. Thus, only three subframes can be used for data transmission within one HARQ cycle. As there are 10 subframes in one HARQ cycle (e.g. subframes 0 to 9, subframes 10 to 19), the SF utilization would be 3/10=30%.

Figure 2:
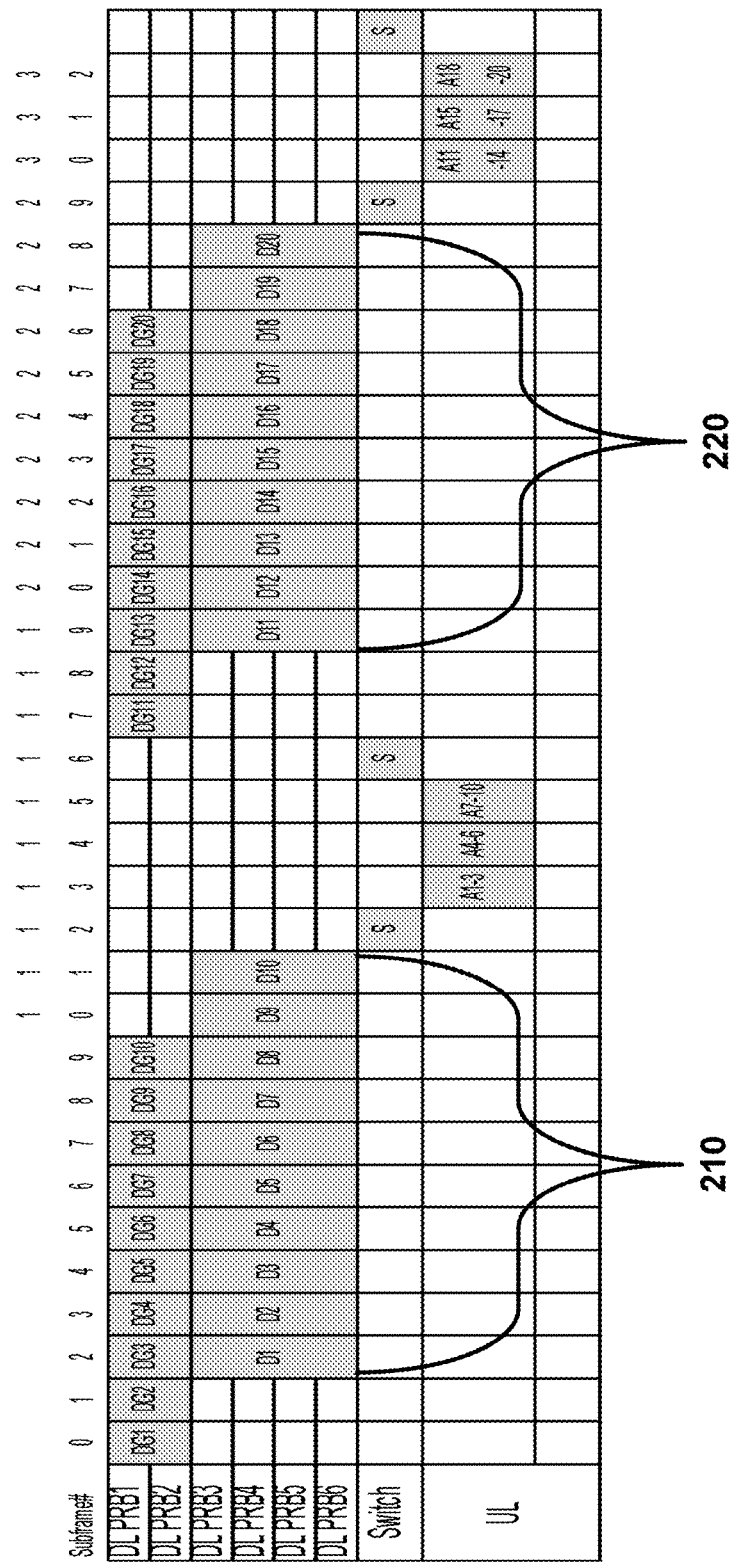
FIG. 2 illustrates SF utilization for single transport block grants (STBG) downlink (DL) data transmission with 10 HARQs and acknowledgement (ACK) bundling according to the prior art.

In order to increase DL transmission speed, the 3GPP standards committees, in Release 14, have specified ACK bundling and 10 HARQs. This change has resulted in nearly doubled SF utilization (e.g. 30% to 59%) as illustrated in FIG. 2. FIG. 2 illustrates SF utilization for STBG downlink (DL) data transmission with 10 HARQs and acknowledgement (ACK) bundling based on Release 14 of the 3GPP specification. Referring to FIG. 2, subframes 0 to 16 and 17 to 33 may be indicative of initial and subsequent HARQ cycles, respectively. Each of transmitting data D1 to D10, collectively referred to as DL data set 210, and D11 to D20, collectively referred to as DL data set 220, may represent DL data being transmitted via DL physical resource blocks (PRB) 3, 4, 5 and 6 of physical data channel (e.g. PDSCH). During the first HARQ cycle (i.e. subframes 0 to 16), the DL data set 210 occupies PRBs in subframes 2 to 11. Similarly, during the subsequent HARQ cycle (i.e. subframes 17 to 33), DL data set 220 occupies PRBs in subframes 19 to 28. Thus, 10 subframes can be used for data transmission within one HARQ cycle. As there are 17 subframes in each HARQ cycle (e.g. subframes 0 to 16, subframes 17 to 33), the SF utilization would be 10/17=59%.

To further improve SF utilization, it is being considered to increase the number of HARQs from 10 to 14, and adding dynamic delay from DL grant to PDSCH assignment. With these changes, SF utilization may be increased from 59% to 71% as illustrated in FIG. 3.

Figure 3:
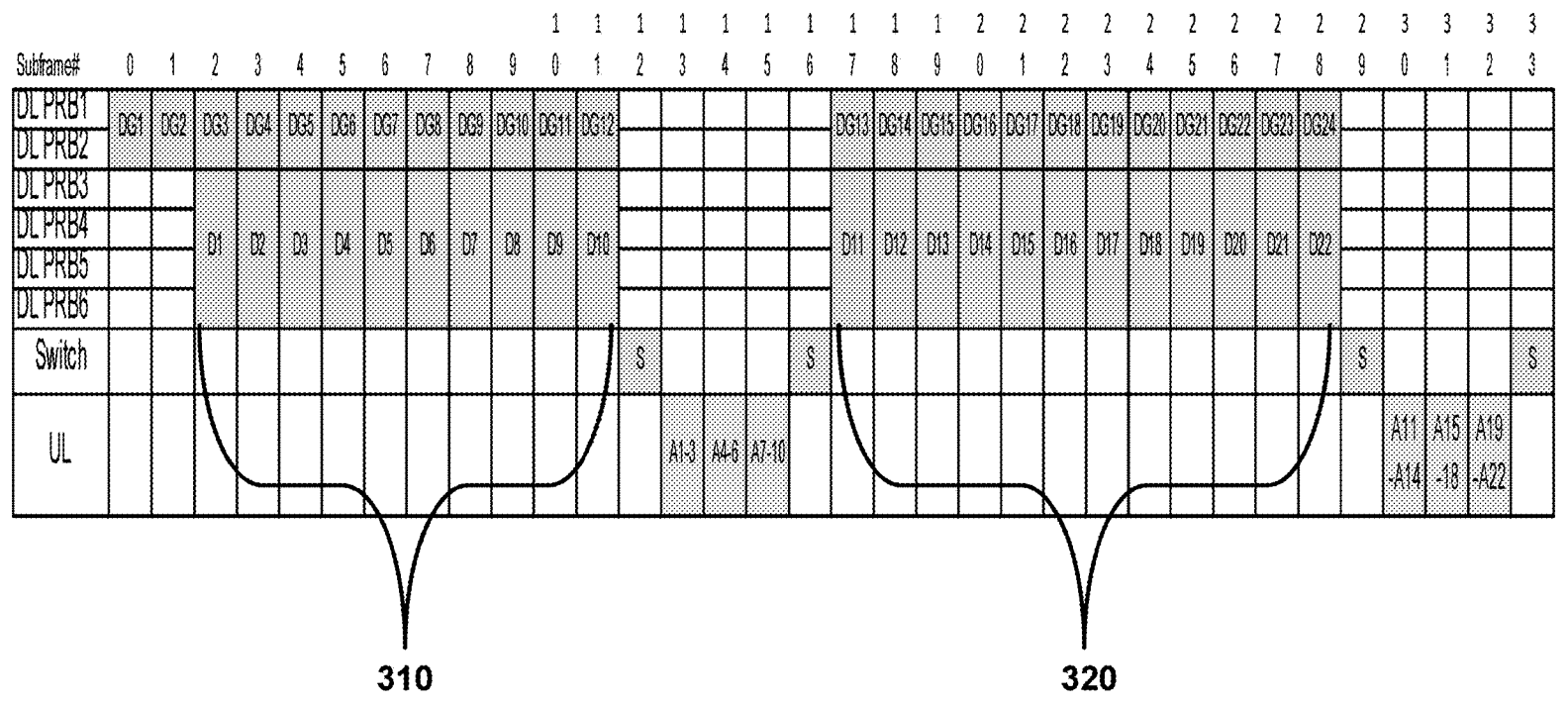

FIG. 3 illustrates SF utilization for STBG DL data transmission with 14 HARQs and ACK bundling. Referring to FIG. 3, subframes 0 to 16 and 17 to 33 may be indicative of initial and subsequent HARQ cycles, respectively. Each of transmitting data D1 to D10, collectively referred to as DL data set 310, and D11 to D22, collectively referred to as DL data set 320, may represent DL data being transmitted via DL physical resource blocks (PRB) 3, 4, 5 and 6 of physical data channel (e.g. PDSCH). During the first HARQ cycle (i.e. subframes 0 to 16), the DL data set 310 occupies PRBs in subframes 2 to 11. On the other hand, during the subsequent HARQ cycle (i.e. subframes 17 to 33), DL data set 320 occupies PRBs in subframes 17 to 28. Thus, 12 subframes can be used for data transmission within one HARQ cycle. As there are 17 subframes in each HARQ cycle (e.g. subframes 0 to 16, subframes 17 to 33), the SF utilization would be 12/17=71%.

In the examples illustrated in FIGS. 1 to 3, each of the DL grants (e.g. each of DG 1 to DG 3 in FIG. 1, DG 1 to DG 10 in FIG. 2, DG 1 to DG 12 in FIG. 3) may be DL single TB grant on MTC physical downlink control channel (MPDCCH) and scheduled using two PRBs among six PRBs. The remaining four PRBs are used for data channel PDSCH as shown in the figures. Given that grants are signalling overhead, in the examples illustrated in FIGS. 1 to 3, there is 33% of signalling overhead.

While the size of the DL grants are much smaller than that of data (i.e. 43 bits vs. 1000 bits), the DL grants may need to be more reliable (e.g. 1% vs. 10%) and require more resource per bit, for example twice or more resources may be needed to meet such reliability requirement. Furthermore, given that data is turbo coded and the DL grants are convolution coded, the coding gain for larger data packets can be improved. As the data channels can be scheduled with only integer numbers of PRBs, at least one PRB is left for DL grants thereby rendering, at minimum, 17% (⅙) of signaling overhead.

Figure 4:
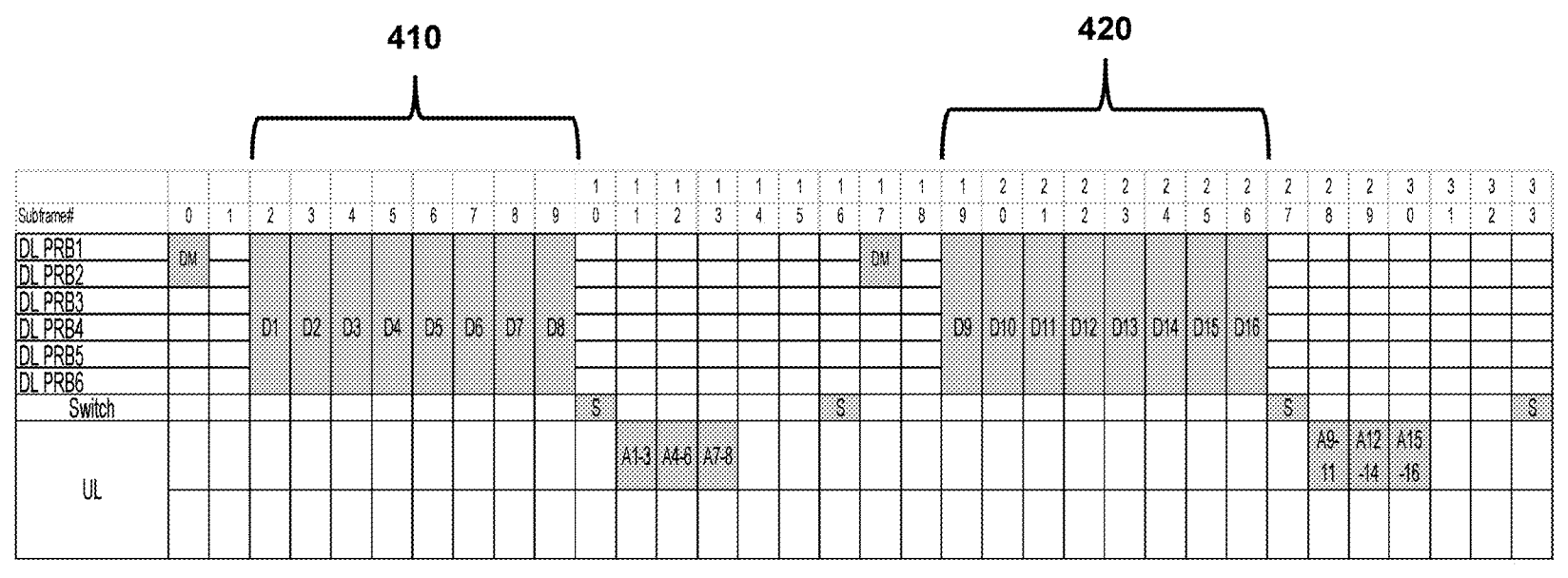

In order to reduce signalling overhead, the 3GPP standards committees, in Release 16, have specified a multi TB grant (MTBG) mechanism which allows a single grant to schedule multiple (e.g. up eight) data transmissions, as is illustrated in FIG. 4. FIG. 4 illustrates SF utilization for MTBG DL data transmission with 8 HARQs and ACK bundling based on Release 16 of the 3GPP specification.

Referring to FIG. 4, subframes 0 to 16 and 17 to 33 may be indicative of a first and second HARQ cycles, respectively. Each of transmitting data D1 to D8, collectively referred to as DL data set 410, and D9 to D16, collectively referred to as DL data set 420, may represent DL data being transmitted via DL PRB 1 to 6 of physical data channel (e.g. PDSCH). During the first HARQ cycle (i.e. subframes 0 to 16), the DL data set 410 occupy PRBs in subframes 2 to 9. Similarly, during the second HARQ cycle (i.e. subframes 17 to 33), DL data set 420 occupies PRBs in subframes 19 to 26. Thus, 8 subframes can be used for data transmission within one HARQ cycle. As there are 17 subframes in each HARQ cycle (e.g. subframes 0 to 16, subframes 17 to 33), the SF utilization would be 8/17=47%.

Based on the time line illustrated in FIG. 4, signalling overhead can be reduced using a MTBG mechanism. However, simple use of MTBG may also significantly decrease the SF utilization thereby lowering the speed of data transmission.

In a wireless communication system, such as LTE, the code rate may be indicative of the ratio between the amount of data sent (i.e. TBS) and the amount of resources assigned (i.e. number of PRBs). The code rate, therefore, can be estimated using the TBS and the total number of PRBs per subframe that is available for transmission of that transport block. The code rate is proportional to the TBS but inversely proportional to the number of PRBs (i.e. code rate α TBS/number of PRBs). For example, the coding rate for 400 bit data using 4 PRBs is similar to the coding rate of 600 bit data using 6 PRBs. A lower code rate indicates that there are more redundancy bits inserted during the channel coding process. On the other hand, a higher code rate indicates that less redundancy bits are inserted during the channel coding process. In other words, higher code rates may provide less decoding power and a higher block error rate (BLER) under the same channel conditions (i.e. BLER α Code Rate).

The base station (e.g. eNB, gNB) may have a target BLER for the data channel (e.g. approximately 10%). When the BLER is above the target rate, the base station may increase the code rate thereby requiring more resources. If more resources are not available, the base station may need to lower the TBS thereby reducing the data rate. In other words, unless a wireless device (e.g. UE) is within an excellent coverage area, the data rate would be proportional to the number of available PRBs (i.e. data rate α number of available RPBs).

As illustrated in the time line of STBG scheduling of FIG. 3 and the time line of MTBG scheduling of FIG. 4, STBG scheduling has 4 PRBs available for data transmissions whereas MTBG scheduling has 6 PRBs available for data transmissions. This means higher TBS may be available in more of the cells or blocks for MTBG scheduling.

Figure 5:
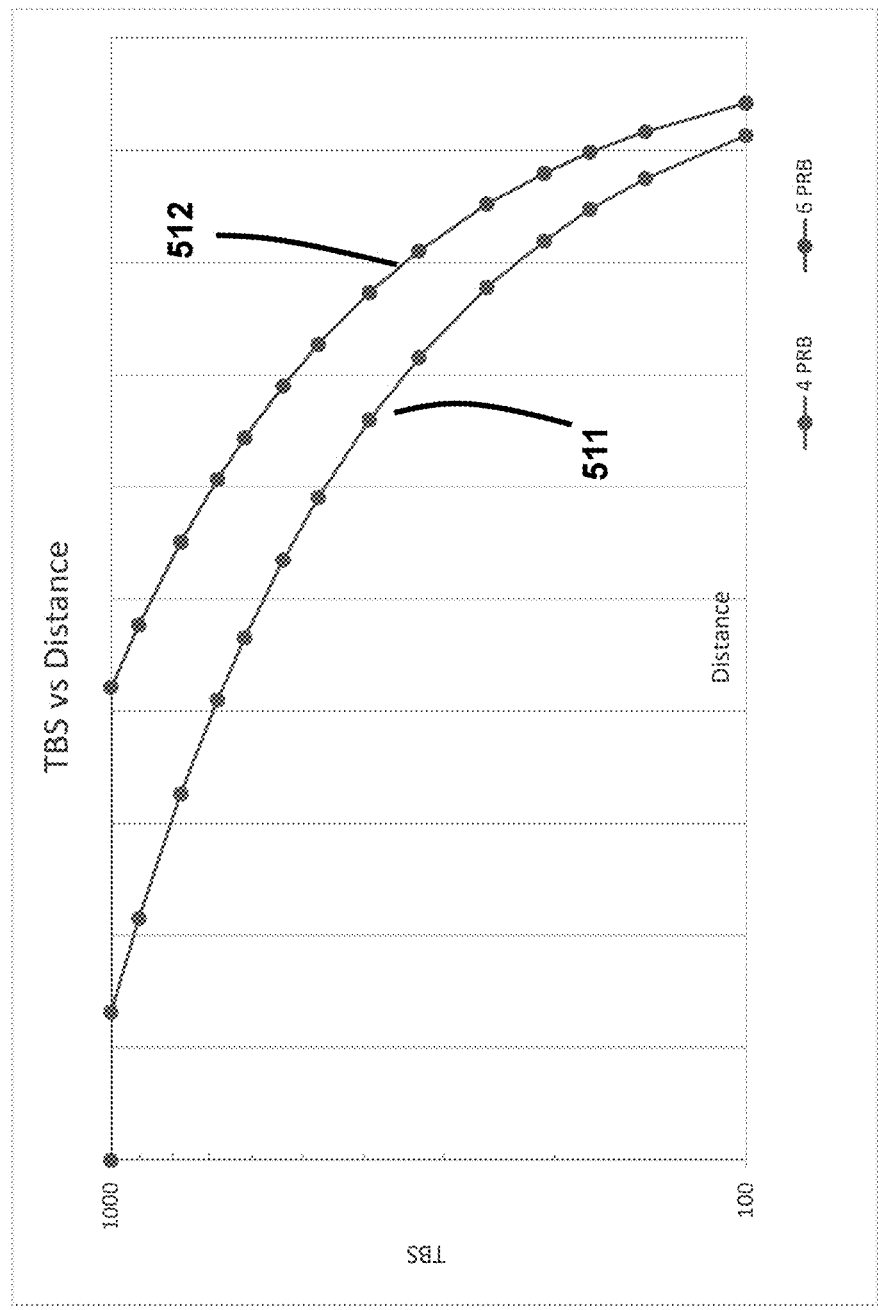
FIG. 5 illustrates the correlation between the transport block size (TBS) and the distance from the base station for allocation of 4 PRBs and 6 PRBs.

FIG. 5 illustrates the correlation between the transport block size (TBS) and the distance from the base station for allocation of 4 PRBs 511 and 6 PRBs 512. As illustrated in FIG. 5, when 6 PRBs are allocated, the maximum TBS of 1000 bits can be scheduled in a longer distance from the base station than when 4 PRBs are allocated. STBG scheduling, unlike MTBG scheduling, shares DL PRBs with DL grants (e.g. DL single TB grant on MPDCCH) and therefore has fewer available PRBs for data transmissions that limits the cell area in which large TBS and data transmissions with high speed can be scheduled.

As stated above, both STBG and MTBG have at least some problems. For example, STBG scheduling provides higher signalling overhead and limits the cell area where maximum TBS and data transmission speed are available. STBG scheduling, however, provides higher peak speed through higher SF utilization. However, MTBG scheduling provides lower signalling overhead and larger cell area where maximum TBS and data transmission speeds are available. MTBG, however, reduces data transmission speed due to lower SF utilization. As such, it is desired to enhance MTBG scheduling such that the data transmission speed decreased due to lower SF utilization can be improved.

Figure 6:
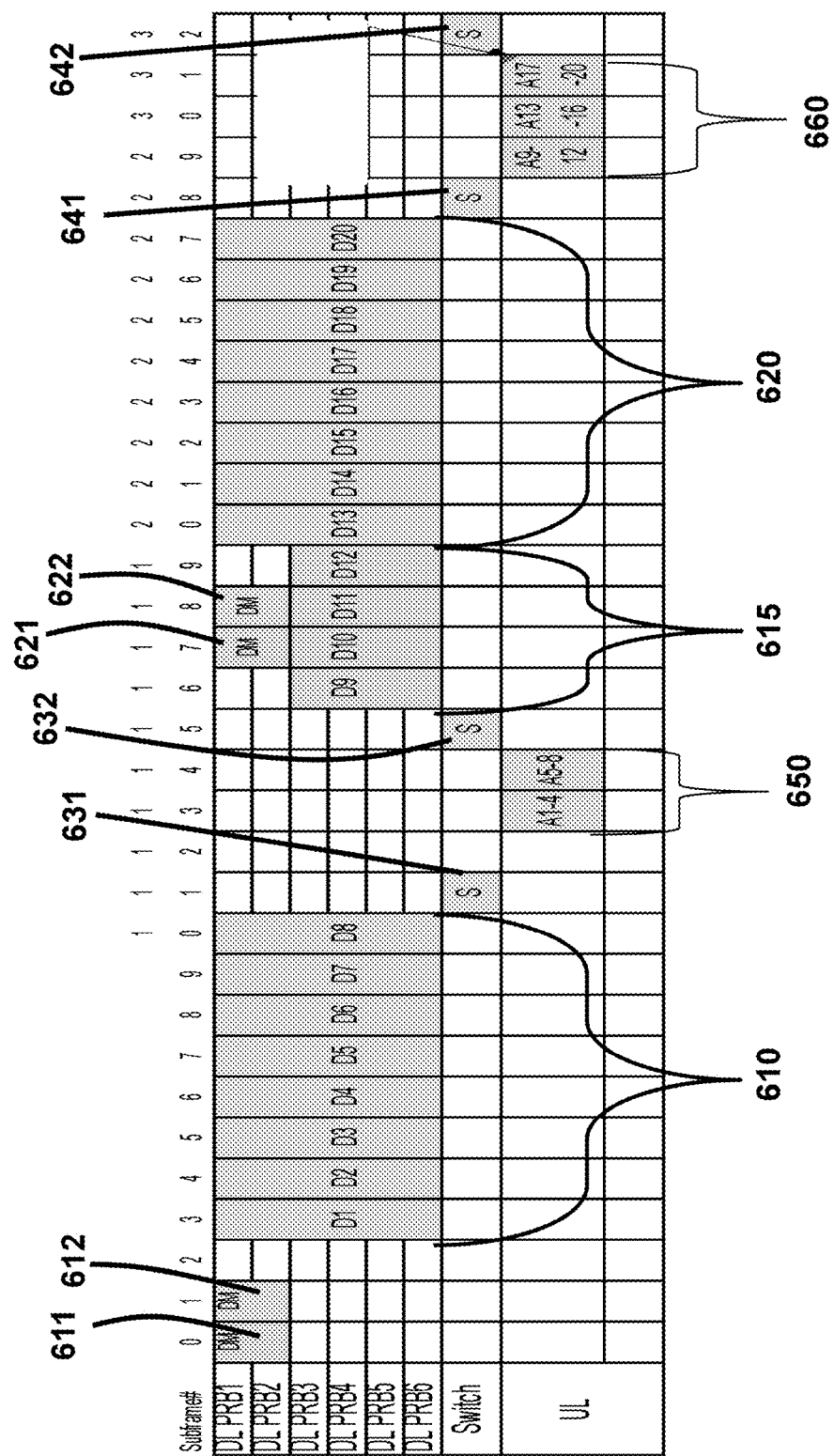
FIG. 6 illustrates SF utilization for MTBG DL data transmission with 16 HARQs and ACK bundling, in accordance with embodiments of the present disclosure.
Figure 7:
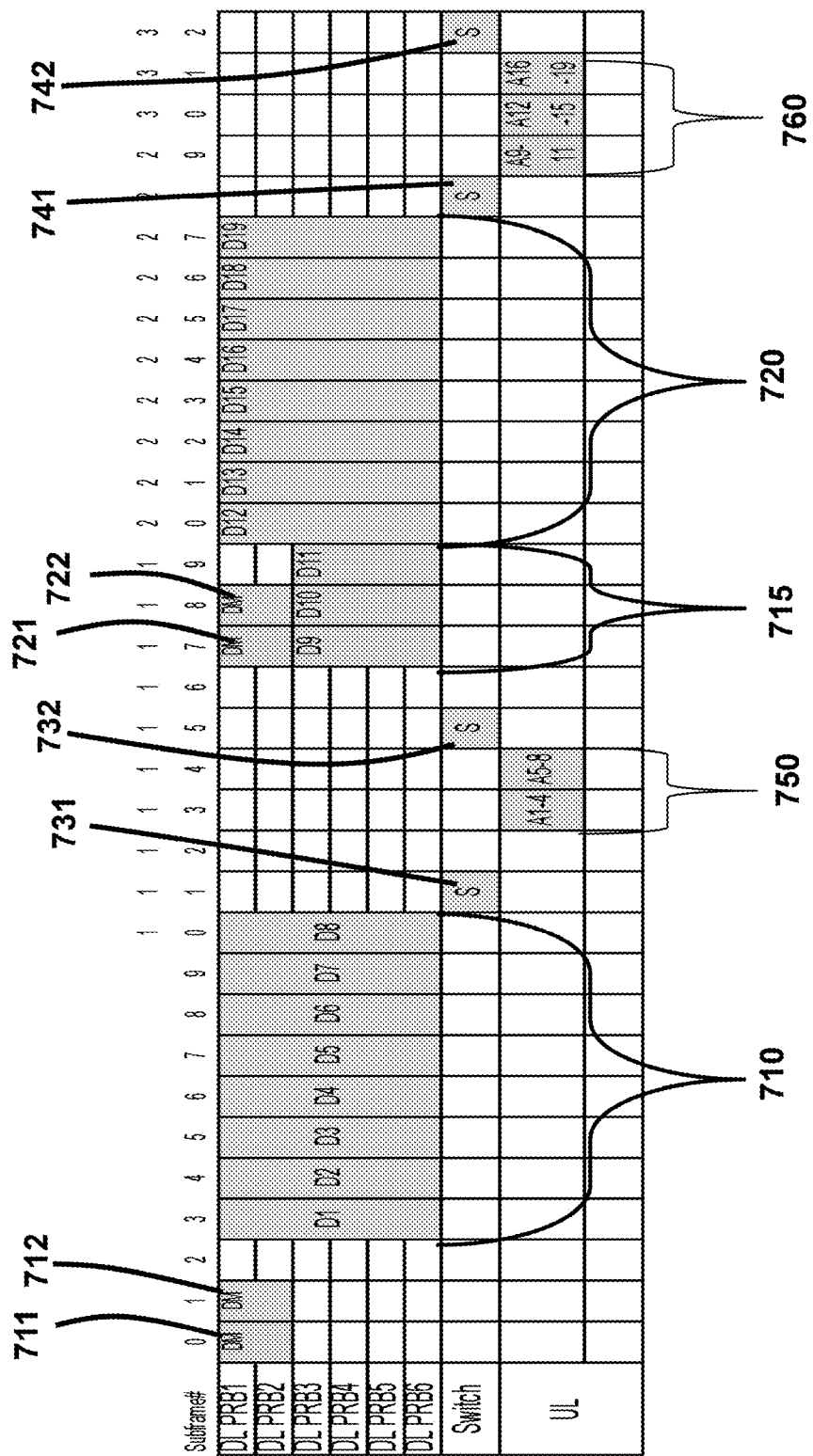
FIG. 7 illustrates SF utilization for MTBG DL data transmission with 14 HARQs and ACK bundling, in accordance with embodiments of the present disclosure.

According to embodiments, data transmission using MTBG can be enhanced by increasing the number of HARQs for DL MTBG. The number of HARQs may be increased to 16 or 14 for the MTBG scheduling mechanism, which allows a single grant to schedule up to 8 data transmissions, (e.g. as specified in Release 16 of the 3GPP specification). The MTBG scheduling mechanism with 16 HARQs is illustrated in FIG. 6 and the MTBG scheduling mechanism with 14 HARQs is illustrated in FIG. 7. It may be noted that standardizing the increase of the number of HARQs to either 16 or 14 may not be acceptable, for example due to UE complexity reasons, (e.g. inclusion of IoT devices). As such, MTBG scheduling mechanisms with 16 HARQs and with 14 HARQs are introduced, as is illustrated in FIGS. 6 and 7, respectively.

According to embodiments, the number of HARQ processes can be increased to 16 or alternatively can be increased to 14. In some embodiments, the increase of the number of HARQ processes may be explicitly signaled in downlink control information (DCI) with one extra bit, if HARQ identifiers (IDs) are divided into two sets. For instance, when there are 16 HARQs, the extra bit in the DCI can represent that HARQ IDs 1 to 8 are grouped into the first set and the HARQ IDs 9 to 16 are grouped into the second set, thereby also indicating there are 16 HARQs. Similarly, when there are 14 HARQs, the extra bit in the DCI may represent that HARQ IDs 1 to 8 are grouped into the first set and the HARQ IDs 9 to 14 are grouped into the second set, thereby also indicating there are 14 HARQs. In some embodiments, the increase of the number of HARQ processes may be implicitly indicated using time delay between acknowledgement (ACK) and the transmission of the next grant. For instance, if a DL grant is received within 4 subframes (<4 SF) from the last transmitted ACK, this new DL grant may be associated with the HARQ IDs in the second set. Otherwise, the DL grant may be associated with the HARQ IDs in the first set.

According to embodiments, the DL MTBG may specify the time delay between DL MTBG and the DL data transmission. For instance, when there are 16 HARQs, the DL MTBG specifies whether the time delay between DL MTBG and the DL data transmission is 2 subframes or 16 subframes. When there are 14 HARQs, the DL MTBG specifies whether the time delay between DL MTBG and the DL data transmission is 2 subframes or 17 subframes. The time delay between DL MTBG and the DL data transmission may be explicitly specified in the DCI with one extra bit. Alternatively, the time delay between DL MTBG and the DL data transmission may be implicitly determined based on the HARQ ID or HARQ ID set. For example, in various embodiments, data transmissions associated with HARQ IDs 1 to 8 (i.e. HARQ IDs in the first set) would occur 2 subframes after the DL MTBG and data transmissions associated with HARQ IDs 9 to 16 (or 14) (i.e. HARQ IDs in the second set) would occur 16 (or 17) subframes after the DL MTBG.

According to embodiments, the DL MTBG may also specify the time delay between the DL data transmission and ACK sent on the the physical uplink control channel (PUCCH). For instance, the DL MTBG specifies whether the time delay between the DL data transmission and ACK is 3 subframes or 10 subframes. The time delay between the DL data transmission and ACK may be explicitly specified in DCI with one extra bit. Alternatively, the time delay between the DL data transmission and ACK may be implicitly determined based on the HARQ ID or HARQ ID set. In various embodiments, ACK associated with HARQ IDs 1 to 8 (i.e. HARQ IDs in the first set) would occur 3 subframes after the DL data transmissions and ACK associated with HARQ IDs 9 to 16 (or 14) (i.e. HARQ IDs in the second set) would occur 10 subframes after the DL data transmission.

According to embodiments, the base station (e.g. evolved Node B (eNB), next generation Node B (gNB)) can schedule a second DL MTBG for another four or three DL data subframes on PDSCH, depending on the number of HARQs, that would be sent in the next HARQ cycle. In other words, four or three additional DL data subframes, depending on the number of HARQs, can be scheduled after the UE acknowledges the data transmission from the current HARQ cycle.

FIGS. 6 and 7 illustrate SF utilization for MTBG DL data transmission with increased number of HARQs and ACK bundling, in accordance with embodiments of the present disclosure. FIG. 6 illustrates SF utilization for MTBG with 16 HARQs and FIG. 7 illustrates SF utilization for MTBG with 14 HARQs.

Referring to FIG. 6, subframes 0 to 15 and subframes 16 to 32 may be indicative of first and second HARQ cycles, respectively. Each of transmitting data D1 to D8, collectively referred to as DL data set 610, D9 to D12, collectively referred to as DL data set 615, and D13 to D20, collectively referred to as DL data set 620, may represent DL data being transmitted via DL physical resource blocks (PRBs) 1 to 6 of the physical downlink shared channel (e.g. PDSCH).

The network can send two DL MTBGs (e.g. DMs 611/612 and DMs 621/622) at each HARQ cycle. The first DL MTBGs (e.g. DM 611 and DM 621) may provide grants for up to four DL data transmissions on the PDSCH (e.g. DL data set 615) right after the UL-to-DL switching subframe (e.g. switching subframe 632, switching subframe 642). The second DL MTBG (e.g. DM 612 and DM 622) may provide grants for up to eight DL data on the PDSCH (e.g. DL data set 610, DL data set 620) before the DL-to-UL switching subframe (e.g. switching subframe 631, switching subframe 641). The UE can be able to acknowledge all 12 DL data transmissions during the three SF UL phase (e.g. subframes 12 to 14 and subframes 29 to 31), using ACK bundling (e.g. acknowledgments 650 and acknowledgments 660).

During the second HARQ cycle (i.e. subframes 16 to 32), DL data sets 615 and 620 occupy PRBs in subframes 16 to 27. Thus, up to 12 subframes can be used for data transmission within this HARQ cycle. As there are 17 subframes in each HARQ cycle (e.g. subframes 16 to 32), the SF utilization would be 12/17=70.6%.

Referring to FIG. 7, subframes 0 to 15 and subframes 16 to 32 may be indicative of first and second HARQ cycles, respectively. Each of transmitting data D1 to D8, collectively referred to as DL data set 710, D9 to D11, collectively referred to as DL data set 715, and D12 to D19, collectively referred to as DL data set 720, may represent DL data being transmitted via DL physical resource blocks (PRB) 1 to 6 of the PDSCH.

The network can send two DL MTBGs (e.g. DMs 711/712 and DMs 721/722) at each HARQ cycle. The first DL MTBGs (e.g. DM 711 and DM 721) may provide grants for up to three DL data transmissions on the PDSCH (e.g. DL data set 715) right after the UL-to-DL switching subframe (e.g. switching subframe 732, switching subframe 742). The second DL MTBG (e.g. DM 712 and DM 722) may provide grants for up to eight DL data on the PDSCH (e.g. DL data set 710, DL data set 720) before the DL-to-UL switching subframe (e.g. switching subframe 731, switching subframe 741). The UE can be able to acknowledge all 11 DL data transmissions during the three subframe UL phase (e.g. subframes 12 to 14 and subframes 29 to 31), using ACK bundling (e.g. acknowledgments 750 and acknowledgments 760).

During the second HARQ cycle (i.e. subframes 16 to 32), DL data sets 715 and 720 occupy PRBs in subframes 17 to 27. Thus, up to 11 subframes can be used for data transmission within this HARQ cycle. As there are 17 subframes in each HARQ cycle (e.g. subframes 16 to 32), the SF utilization would be 11/17=65%.

As described above, an increase of number of HARQs to 16 or 14 can be implicitly specified based on the gap between ACK and the grant in the next HARQ cycle. In particular, referring to FIG. 6, when the time between the acknowledgments 650 and the DM 621 is less than 4 subframes, receiving devices (e.g. UEs) may implicitly recognize that the DM 621 is associated with a HARQ process set that is different from the HARQ process set associated with DM 622. Similarly, referring to FIG. 7, when the time between the acknowledgments 750 and the DM 721 is less than 4 subframes, receiving devices (e.g. UE) may implicitly recognize the DM 721 is associated with a HARQ process set that is different from the HARQ process set associated with DM 722. Using this implicit method, the base station (e.g. eNB, gNB) needs to receive the acknowledgments in subframes 13/14 (e.g. ACKs 650 or 750) in order to timely transmit the grants in subframe 17 (e.g. DM 621 or 721).

According to embodiments, during the first HARQ cycle (e.g. subframes 0 to 15), the base station cannot send two DL MTBGs but can send only one MTBG for the first HARQ ID set (e.g. set for HARQ IDs 1 to 8) due to potential HARQ ID set confusion. If more than one MTBG is transmitted and one of MTBG is decoded incorrectly, there can be HARQ ID set confusion because the timing of MTBGs would be always valid. As such, this implicit method can have a delay of one HARQ cycle before the DL data transmission performs at full speed (i.e. "slow start"). For example, MTBG 611/711 would not be transmitted and D9, D10 and D11 could not be transmitted in SFs 17-19. As such, after SF 34 full speed of the communication network may be achieved.

According to embodiments, if the UE correctly receives the DL MTBG 621 or 721 (in SF 17) for scheduling DL transmission in SFs 33 to 36 or SFs 34 to 36 but does not correctly receive the DL MTBG in 622 or 722 (in SF 18), this can lead to HARQ ID confusion in the next HARQ cycle. It can be desired that this situation be corrected by having the eNB re-start as defined above. For example, during the first HARQ cycle (e.g. subframes 0 to 15), the base station cannot send two DL MTBGs but can send only one MTBG for the first HARQ ID set (e.g. set for HARQ IDs 1 to 8). This fresh restart can begin with a new DL MTBG on SF 34. This fresh restart can mean that SF 33 may not be used for scheduling any DL transmissions using a MTBG in SF 16 or SF 17. The eNB can detect that the UE has not received the DL that was scheduled by the DL MTBG 622 or 722 because no acknowledgements (ACKs) will be received in SF 30 and SF 31.

According to embodiments, when the receiving device (e.g. UE) receives DL MTBG (e.g. DM 622 or 722) for the first HARQ ID set (e.g. set for HARQ IDs 9 to 16) in subframe 18 but does not correctly receive DL MTBG (e.g. DM 621 or 721 which can schedule DL transmissions in SFs 33 to 36 and SFs 34 to 36, respectively) for the next HARQ ID set in subframe 17, the base station, in the next HARQ cycle, may send a DL MTBG for the first HARQ ID set (e.g. set for HARQ IDs 1 to 8) at subframe 35 (not shown in FIGS. 6 and 7) and DL MTBG for the second HARQ ID set (e.g. set for HARQ IDs 9 to 16 or 9 to 14) at subframe 34 (not shown in FIGS. 6 and 7). In other words, the base station does not need to do a "slow start". In order for this configuration to be suitable, a DL MTBG with valid timing (e.g. DM 622 or 722 in subframe 18) may need to be associated with the first HARQ ID set (e.g. set for HARQ IDs 1 to 8) by the receiving device (e.g. UE).

According to embodiments, the number of HARQs scheduled per HARQ cycle may be increased from 8 to 12 (or 11). As explicitly illustrated above with respect to FIGS. 6 and 7, the first DL MTBGs (e.g. DM 611 or 711) may provide grants for up to four or three DL data transmissions on the PDSCH (e.g. DL data set 615 or 715) and the second DL MTBG (e.g. DM 612 or 712) may provide grants for up to eight DL data on the PDSCH (e.g. DL data set 610 or 710). However, the number of HARQs needed would be 16 (or 14), not 12 (or 11). As such, the number of HARQs needed may be determined as given in Equation 3:

$$\text{Number of HARQs needed} = \text{number of HARQs in cycle} + \text{number of HARQs scheduled in the next HARQ cycle} \quad (3)$$

In the case as illustrated in FIG. 6, 12 HARQs are scheduled in the HARQ cycle and 4 HARQs are scheduled in the next HARQ cycle, therefore 16 HARQs are needed in total. In case illustrated in FIG. 7, 11 HARQs are scheduled in the HARQ cycle and 3 HARQs are scheduled in the next HARQ cycle, therefore 14 HARQs are needed in total. It is noted that the number of HARQs does not line up in the same manner in which the DL SFs are grouped, which can be due to constraints regarding how grants and acknowledgements can be grouped.

In some embodiments, more than 16 HARQs can be added. In such cases, the first DL MTBGs in the HARQ cycle (e.g. DM 621 or 721 or DM 611 or 711) may be allowed to schedule more than 4 HARQs which would further increase SF utilization. For instance, if 24 HARQs are supported, the first DL MTBGs in the HARQ cycle can schedule up to 8 HARQs for a total of 16 per HARQ cycle. This would further increase the SF utilization to 16/22=72.7%

According to embodiments, there are a number of advantages of increasing the number of HARQs for MTBG. As the number of HARQs are increased for MTBG data transmission, there would be lower signalling overhead compared to existing STBG transmissions. While only 2 PRBs are used for MPDCCH in 2 of 12 DL SFs by the MTBG transmission of FIG. 6, the STBG transmissions suggested in FIG. 3 use 2 PRBs in all 12 DL SFs. Specifically, signalling overhead of various embodiments of the present disclosure would be 4/(4*4+8*6)=6.25%, whereas signalling overhead of existing STBG transmissions is 33% previously presented above.

Further, in various embodiments, 6 PRBs can be scheduled in 8 SFs out of 12 SFs and 4 PRBs can be scheduled in 4 (or 3) SFs in the PDSCH. Therefore, larger TBs can be scheduled in a larger cell area than STBG data transmissions.

Moreover, increasing the number of HARQs may result in SF utilization for MTBG transmissions being increased. With 16 HARQs, the SF utilization for MTBG data transmission would be increased to the same SF utilization level for STBG transmission (e.g. 71%). With 14 HARQs, the SF utilization for MTBG data transmission would be increased to 65%. Both improved SF utilizations are higher than SF utilization (i.e. 47%) for MTBG DL data transmission of Release 16 of the 3GPP specification.

Upon increasing the number of HARQs, for example to 16 or 14 HARQs, the DL PRBs may be or may need to be shared between the control channel (e.g. MPDCCH) and data channel (e.g. PDSCH). Where sharing DL PRBs is not desired or cannot be tolerated, the overlap between MTBG and data transmission can be avoided as is illustrated below.

According to embodiments, the number of UL HARQ processes may be increased beyond 8, which requires at least one bit in MTBG transmission. In some embodiments, the increase of the number of HARQ processes may be explicitly signaled in DCI with one extra bit, if HARQ identifiers (IDs) are divided into two sets. For instance, when there are 16 HARQs, the extra bit in the DCI may represent that HARQ IDs 1 to 8 are grouped into the first set and the HARQ IDs 9 to 16 are grouped into the second set, thereby also indicating there are 16 HARQs. In some embodiments, the increase of the number of HARQ processes may be implicitly indicated using time delay between the end of the scheduled PUSCH ACK and the next grant. For instance, if a UL MTBG is received within 4 subframes (<4 SF) from the last transmitted UL data on PUSCH, this new UL MTBG may be associated with a different set HARQ processes from the HARQ processes associated with the UL data transmission on PUSCH.

According to embodiments, the DL MTBG may specify the time delay between DL MTBG and the DL data transmission. For instance, when there are 16 HARQs, the DL MTBG specifies whether the time delay between DL MTBG and the DL data transmission is 2 subframes or 9 subframes. The time delay between DL MTBG and the DL data transmission can be explicitly specified in DCI with one extra bit, (for example the DCI format used by UL MTBG, or other DCI format for example DCI format 1(x) or 2(x)). Alternatively, the time delay between DL MTBG and the DL data transmission can be implicitly determined based on the HARQ ID or HARQ ID set. In various embodiments, data transmissions associated with HARQ IDs 1 to 8 (i.e. HARQ IDs in the first set) can occur 2 subframes after the DL MTBG and data transmissions associated with HARQ IDs 9 to 16 (i.e. HARQ IDs in the second set) can occur 9 subframes after the DL MTBG.

According to embodiments, the DL MTBG may also specify the time delay between the DL data transmission and ACK sent on the physical uplink control channel (PUCCH). For instance, the DL MTBG specifies whether the time delay between the DL data transmission and ACK is 4 subframes or 10 subframes. The time delay between the DL data transmission and ACK may be explicitly specified in DCI with one extra bit (for example the DCI format used by UL MTBG, or other DCI format for example DCI format 1(×) or 2(×)). Alternatively, the time delay between the DL data transmission and ACK may be implicitly determined based on the HARQ ID or HARQ ID set. In various embodiments, the ACK associated with HARQ IDs 1 to 8 (i.e. HARQ IDs in the first set) can occur 4 subframes after the DL data transmissions and ACK associated with HARQ IDs 9 to 16 (i.e. HARQ IDs in the second set) can occur 10 subframes after the DL data transmission.

In some embodiments, while the number of DL HARQ processes can be increased to a number greater than 8, more than 16 HARQ processes may result in diminishing returns. While the first grant may be not required to schedule 8 TBs, in such cases, there will be a hole in the HARQ cycle which will reduce SF utilization.

Figure 8:
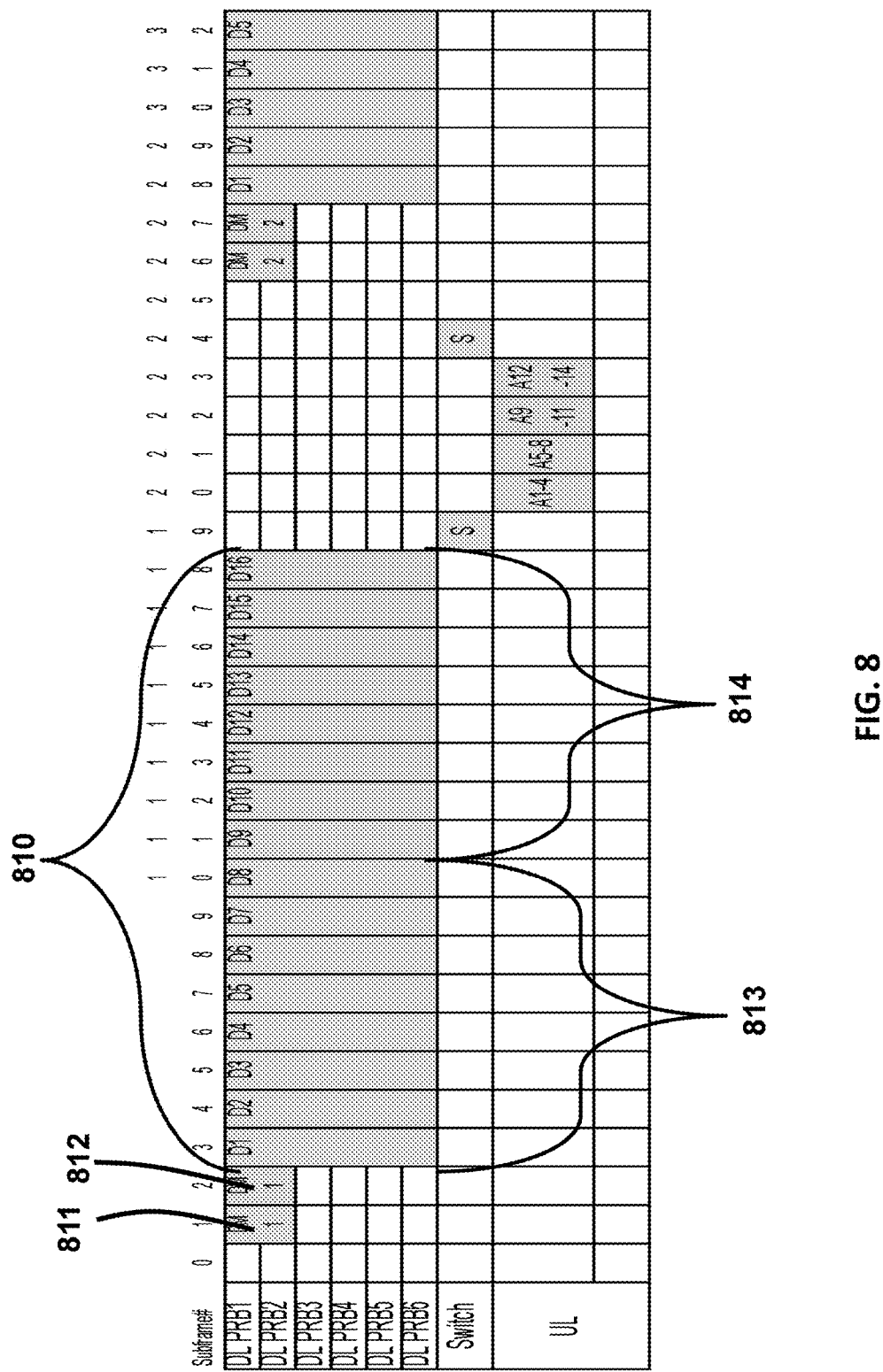
FIG. 8 illustrates SF utilization for no-overlap MTBG DL data transmission with 16 HARQs and ACK bundling, in accordance with embodiments of the present disclosure.

FIG. 8 illustrates SF utilization for no-overlap MTBG DL data transmission with 16 HARQs and ACK bundling, in accordance with embodiments of the present disclosure. Referring to FIG. 8, subframes 0 to 24 may be indicative of a HARQ cycle. There may be two DL MTBGs (e.g. DMs 811/812) at each HARQ cycle. Each of transmitting data D1 to D16, collectively referred to as DL data set 810, may represent DL data being transmitted via DL physical resource blocks (PRB) 1 to 6 of physical data channel (e.g. PDSCH). Transmitting data D1 to D8 is also collectively referred to as DL data set 813 and transmitting data D9 to D16 is also collectively referred to as DL data set 814.

As illustrated in FIG. 8, the DL PRBs 1 to 6 do not need to be shared between the control channel (e.g. MPDCCH) and data channel (e.g. PDSCH). The control channel (e.g. MPDCCH) occupies the DL PRBs 1 and 2 only at subframes 1 and 2 for the DMs 811 and 812, respectively, during the HARQ cycle. The data channel (e.g. PDSCH) can occupy the DL PRBs 1 to 6 only at subframes 3 to 18 for the DL data set 810 during the HARQ cycle. Specifically, the data channel occupies the DL PRBs 1 to 6 at subframes 3 to 10 for the DL data set 813 and at subframes 11 to 18 for the DL data set 814. As such, the first DL MTBG (e.g. DM 811) in subframe 1 has a delay of 2 SFs and the second DL MTBG (e.g. DM 812) in subframe 2 has a delay to the PDSCH of 9 SFs. The DL PRBs 1 to 6 are not shared between the control channel (e.g. MPDCCH) and data channel (e.g. PDSCH) during data transmission and therefore there is no overlap between MTBG and data transmission.

With regard to SF utilization, during the HARQ cycle (i.e. subframes 0 to 24), DL data sets 810 occupies PRBs 1 to 6 in subframes 3 to 18. Thus, 16 subframes have been used for data transmission within this HARQ cycle. As there are 25 subframes in each HARQ cycle (e.g. subframes 0 to 24), the SF utilization would be 16/25=64%.

According to embodiments, there are a number of advantages of increasing the number of HARQs for MTBG while avoiding share of DL PRBs between MTBG and data transmission.

As the number of HARQs are increased for MTBG data transmission, there can be lower signalling overhead compared to existing STBG transmissions. In embodiments with increased number of HARQs for MTBG while avoiding share of DL PRBs between MTBG and data transmission, only 2 PRBs are used for MPDCCH in 2 of 16 DL SFs for MTBG transmission (e.g. the MTBG transmission of FIG. 8). Specifically, signalling overhead of such MTBG transmission would be 4/(16*6)=4.2% whereas signalling overhead of existing STBG transmissions is 33%. Further, the signalling overhead can be lower than that of some other embodiments of the present disclosure where DL PRBs are shared between MTBG and data transmission (i.e. 6.25%).

Moreover, in various embodiments, 6 PRBs can be scheduled in the PDSCH for all transmissions. Therefore, the base station (e.g. eNB, gNB) can schedule a substantially maximum TBS in a larger cell area than STBG data transmissions or other embodiments where DL PRBs are shared between MTBG and data transmission.

Having regard to SF utilization, while lower than SF utilization of STBG data transmissions or some of other embodiments illustrated elsewhere herein, the SF utilization for no-overlap MTBG DL data transmission (i.e. 64%) is higher than SF utilization (i.e. 47%) for MTBG DL data transmission of Release 16 of the 3GPP specification.

Figure 9:
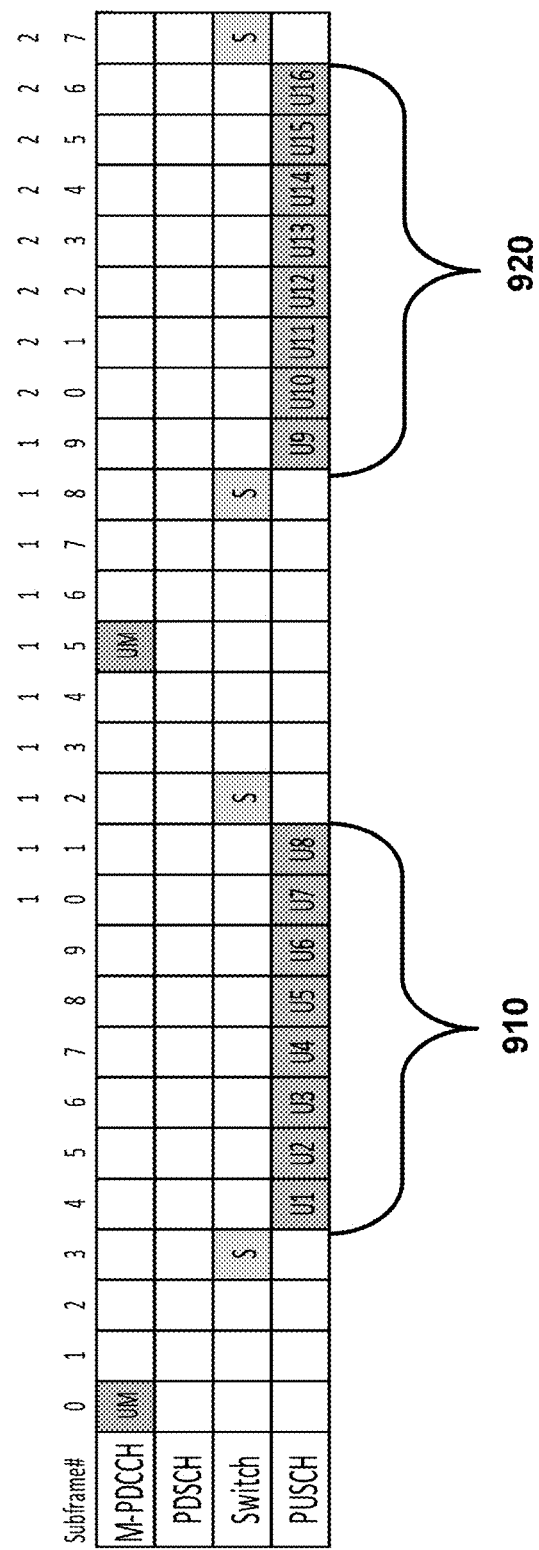
FIG. 9 illustrates SF utilization for MTBG uplink (UL) data transmission with 8 HARQs according to the prior art.

FIG. 9 illustrates SF utilization for legacy MTBG uplink (UL) data transmission with 8 HARQs according to the prior art. Referring to FIG. 9, subframes 0 to 14 and 15 to 29 may be indicative of a first and second HARQ cycles, respectively. Each of transmitting data U1 to U8, collectively referred to as UL data set 910, and U9 to U16, collectively referred to as UL data set 920, may represent UL data being transmitted via physical data channel (e.g. PUSCH). During the first HARQ cycle (i.e. subframes 0 to 12), the UL data set 910 occupies the PUSCH in subframes 4 to 11. Similarly, during the second HARQ cycle (i.e, subframes 15 to 27), UL data set 920 occupies the PUSCH in subframes 19 to 26. Thus. 8 subframes can be used for UL data transmission within one HARQ cycle. As there are 13 subframes in each HARQ cycle (e.g. subframes 0 to 12, subframes 15 to 27), the SF utilization would be 8/15=53%.

According to embodiments, the legacy UL MTBG scheduling, for example the MTBG scheduling illustrated in FIG. 9, can be enhanced. Specifically, SF utilization for MTBG UL data transmission may be improved by increasing the number of HARQs for UL MTBG and supporting variably scheduled time delays between UL MTBG and UL data transmission, as is illustrated in FIGS. 10 and 11 below.

The number of HARQs may be increased such that there are more than 8 HARQs. The increase of the number of HARQ processes may need to be explicitly or implicitly specified. In some embodiments, the increase of the number of HARQ processes may be explicitly signaled in DCI with one extra bit, if HARQ identifiers (IDs) are divided into two sets. For instance, when there are 16 HARQs, the extra bit in the DCI may represent that HARQ IDs 1 to 8 are grouped into the first set and the HARQ IDs 9 to 16 are grouped into the second set, thereby also indicating there are 16 HARQs. In some embodiments, the increase of the number of HARQ processes may be implicitly indicated using time delay between UL data and the next grant. For instance, if a UL grant is received within 4 subframes (<4 SF) from the last transmitted ACK, this new UL grant may be associated with the HARQ IDs in the second set. Otherwise, the UL grant may be associated with the HARQ IDs in the first set, for example with reference to FIG. 11.

To support variable time delay scheduling, the UL MTBG may need to specify whether the time delay between UL MTBG and the UL data transmission is 4 SFs or 10 SFs. The time delay between UL MTBG and the UL data transmission may be explicitly specified in DCI with one extra bit. Alternatively, the time delay between UL MTBG and the UL data transmission can be implicitly determined based on the HARQ ID or HARQ ID set. In various embodiments, data transmissions associated with HARQ IDs 1 to 8 (i.e. HARQ IDs in the first set) would occur 10 SFs after the UL MTBG and data transmissions associated with HARQ IDs 9 to 16 (i.e. HARQ IDs in the second set) would occur 4 SFs after the UL MTBG.

Figure 10:
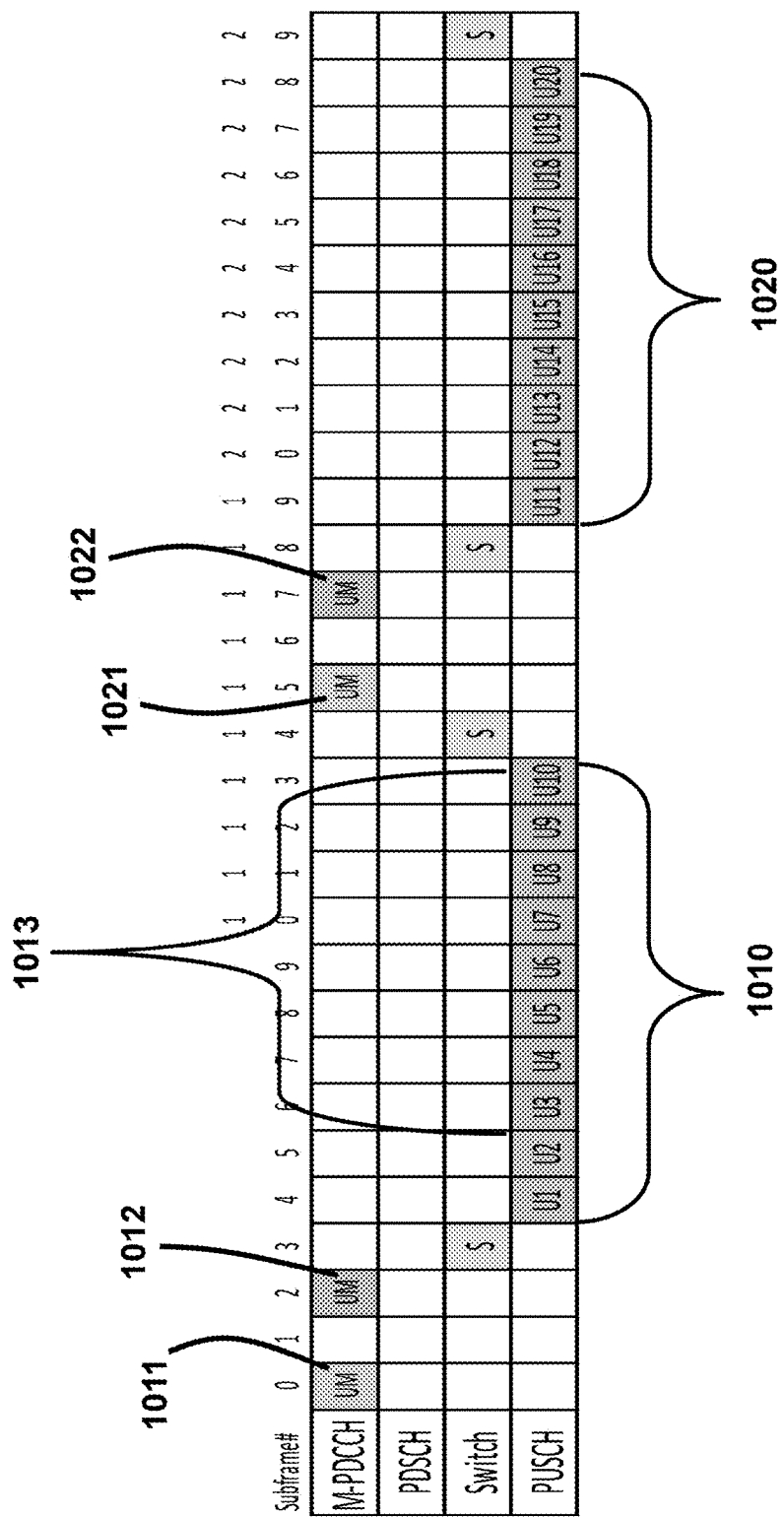
FIG. 10 illustrates SF utilization for MTBG UL data transmission with 10 HARQs, in accordance with embodiments of the present disclosure.
Figure 11:
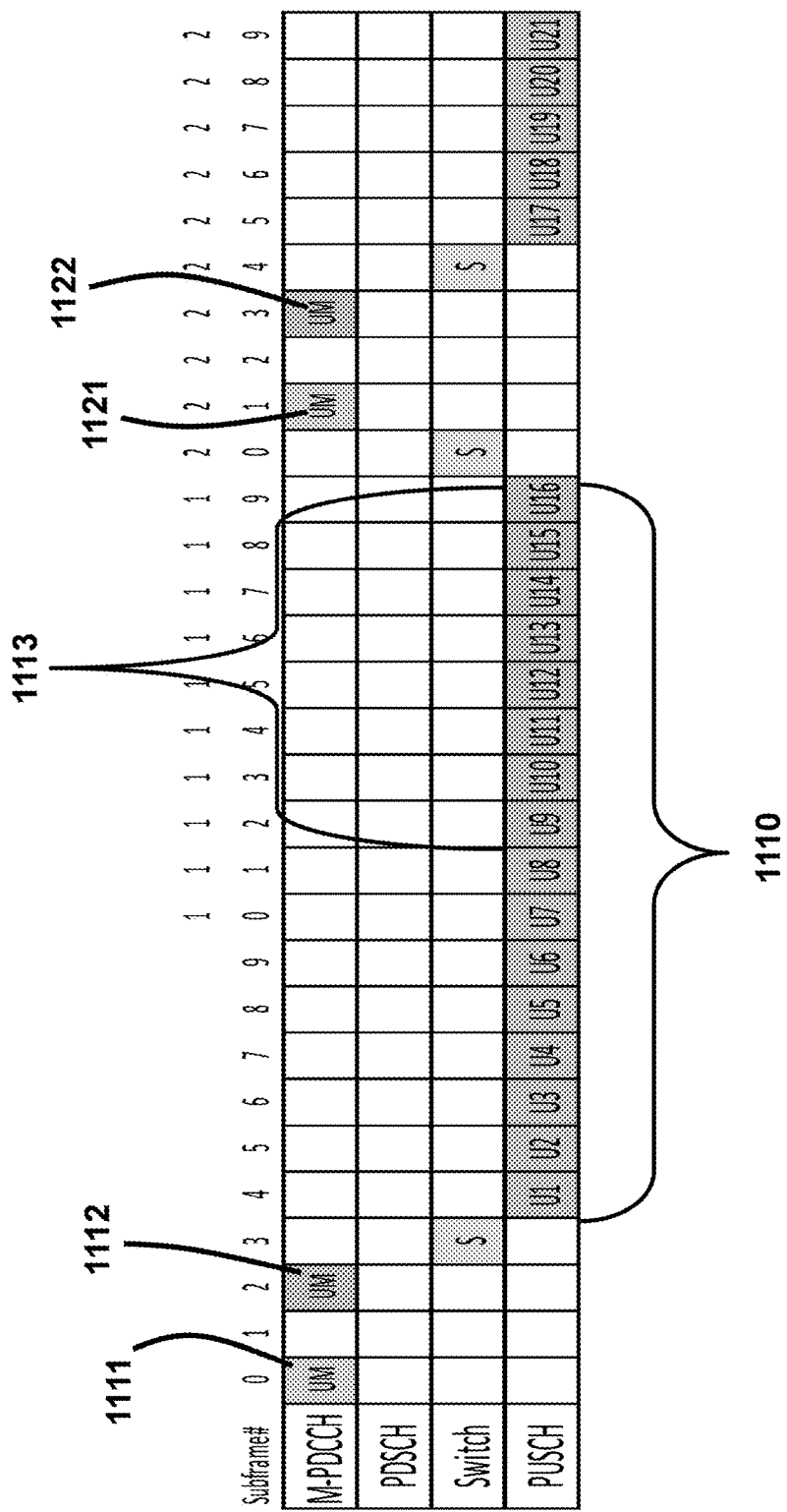
FIG. 11 illustrates SF utilization for MTBG UL data transmission with 16 HARQs, in accordance with embodiments of the present disclosure.

FIG. 10 illustrates SF utilization for MTBG UL data transmission with 10 HARQs, in accordance with embodiments of the present disclosure. Referring to FIG. 10, subframes 0 to 14 and 15 to 29 may be indicative of a first and second HARQ cycles, respectively. Each of transmitting data U1 to U10, collectively referred to as UL data set 1010, and U11 to U20, collectively referred to as UL data set 1020, may represent UL data being transmitted via UL physical data channel (e.g. physical uplink shared channel (PUSCH)). During the first HARQ cycle (i.e. subframes 0 to 14), the UL data set 1010 occupies the PUSCH in subframes 4 to 13. Similarly, during the second HARQ cycle (i.e. subframes 15 to 29), UL data set 1020 occupy the PUSCH in subframes 19 to 28. Thus, 10 subframes can be used for data transmission within one HARQ cycle. As there are 15 subframes in each HARQ cycle (e.g. subframes 0 to 14, subframes 15 to 29), the SF utilization would be 10/15=67%.

FIG. 11 illustrates SF utilization for MTBG UL data transmission with 16 HARQs, in accordance with embodiments of the present disclosure. Referring to FIG. 11, subframes 0 to 20 may be indicative of a single HARQ cycle. In each HARQ cycle, there may be two UL MTBGs (e.g. UM 1111 at subframe 0 and UM 1112 at subframe 2). Each of transmitting data U1 to U16, collectively referred to as UL data set 1110, may represent UL data being transmitted via UL physical data channel (e.g. PUSCH). During the HARQ cycle (i.e. subframes 0 to 20), the UL data set 1110 occupies the PUSCH in subframes 4 to 19. Thus, 16 subframes can be used for data transmission within one HARQ cycle. As there are 21 subframes in a single HARQ cycle (e.g. subframes 0 to 20), the SF utilization would be 16/21=76%.

Further referring to FIG. 11, the time delay between UL MTBG and UL data transmission is variably scheduled. Specifically, the UM 1112 associated with HARQ IDs 0 to 8 (i.e. HARQ IDs in the first set) may have a delay of 10 SFs whereas the UM 1111 associated with HARQ IDs 9 to 16 (i.e. HARQ IDs in the second set) may have a delay of 4 SFs (i.e. legacy delay). To support such variable time delay, each of the UMs 1111 and 1112 may specify whether the time delay for the UL data transmission is 4 SFs or 10 SFs.

Morevoer, while not required, it is preferred that each UL MTBG (e.g. each of the UMs 1111 and 1112) schedules 8 TBs. This is due to a presence of a hole in the HARQ cycle in case 8 TBs are not scheduled by each UL MTBG.

As described above, increase of number of HARQs to 10 or 16 can be implicitly specified relying on the gap between UL data transmission and the UL MTBG in the next HARQ cycle. In particular, referring to FIG. 10, when the time between the UL data transmission in subframe 6 to 13 (i.e. the UL data set 1013) and the UM 1021 is less than 4 subframes, receiving devices (e.g. UE) may implicitly recognize the UM 1021 is associated with a HARQ process set that is different from the HARQ process set associated with UM 1022. Similarly, referring to FIG. 11, the UL data transmission in subframe 12 to 19 (i.e. the UL data set 1113) and the UM 1121 is less than 4 subframes, receiving devices (e.g. UE) may implicitly recognize the UM 1121 is associated with a HARQ process set that is different from the HARQ process set associated with UM 1122.

According to embodiments, during the first HARQ cycle (e.g. subframes 0 to 15 in FIG. 10 and subframes 0 to 20 in FIG. 11), the base station can only start with one MTBG for the first HARQ ID set (e.g. set for HARQ IDs 1 to 8) due to potential HARQ ID set confusion. When two UL MTBGs are sent, the receiving device (e.g. UE) may not receive both UL MTBGs and may not be able to correctly identify the two UL MTBGs and their associated HARQ ID sets. As such, this implicit method will have a delay of one HARQ cycle before the UL data transmission performs at full speed (i.e. "slow start").

In one example, referring to FIG. 10, upon receiving the UM 1012, the UE may send UL data in subframes 6 to 13. Upon receiving this UL data, the eNB may send both the UM 1021 and the UM 1022 in subframes 15 and 17, respectively. It may be noted that UM 1021 is UL MTBG for the second HARQ ID set and the UM 1012 and UM 1022 are UL MTBGs for the first HARQ ID set. Similarly, in another example, referring to FIG. 11, upon receiving the UM 1112, the UE may send UL data in subframes 12 to 19. Upon receiving this UL data, the eNB may send both the UM 1121 and the UM 1122 in subframes 21 and 23, respectively. It may be noted that UM 1121 is UL MTBG for the second HARQ ID set and the UM 1112 and UM 1122 are UL MTBGs for the first HARQ ID set.

According to embodiments, the base station (e.g. eNB, gNB) may send a UL MTBG for the second HARQ ID set only when it correctly detects if the receiving device (e.g. UE) has sent data associated with UL MTBG for the first HARQ ID set. For example, referring to FIGS. 10 and 11, the eNB will send the UM 1021 (or 1121) in subframe 15 (or 21) only after it detects that the UE has sent data associated with UM 1012 (or 1112). This may ensure the receiving device correctly decoded the UL MTBG for the first HARQ ID set (e.g. in subframe 2) and would also correctly send data associated with the MTBG for the second HARQ ID set (e.g. in subframe 15 (or 21)). In other words, if the receiving device does not correctly decode the UL MTBG for the first HARQ ID set, the base station may start the data transmission again by sending only one UL MTBG for the first HARQ ID set (i.e. slow start).

According to embodiments, if the receiving device (e.g. UE) does not correctly receive UL MTBG (e.g. UM 1021 or 1121) for the second HARQ ID set (e.g. in subframe 15 (or 21)) but receives UL MTBG (e.g. UM 1022 or 1122) for the first HARQ ID set (e.g. in subframe 17 (or 23)), the base station (e.g. eNB, gNB) may detect the UL data associated with the UL MTBG for the first HARQ ID set. In this case, the base station can send a UL MTBG for the second HARQ ID set and the first HARQ ID set in the next HARQ cycle. In other words, the base station does not need to do a "slow start".

According to embodiments, the receiving device (e.g. UE) may need to associate a UL MTBG for the first HARQ ID set (e.g. set for HARQ IDs 1 to 8) with valid timing.

Figure 12:
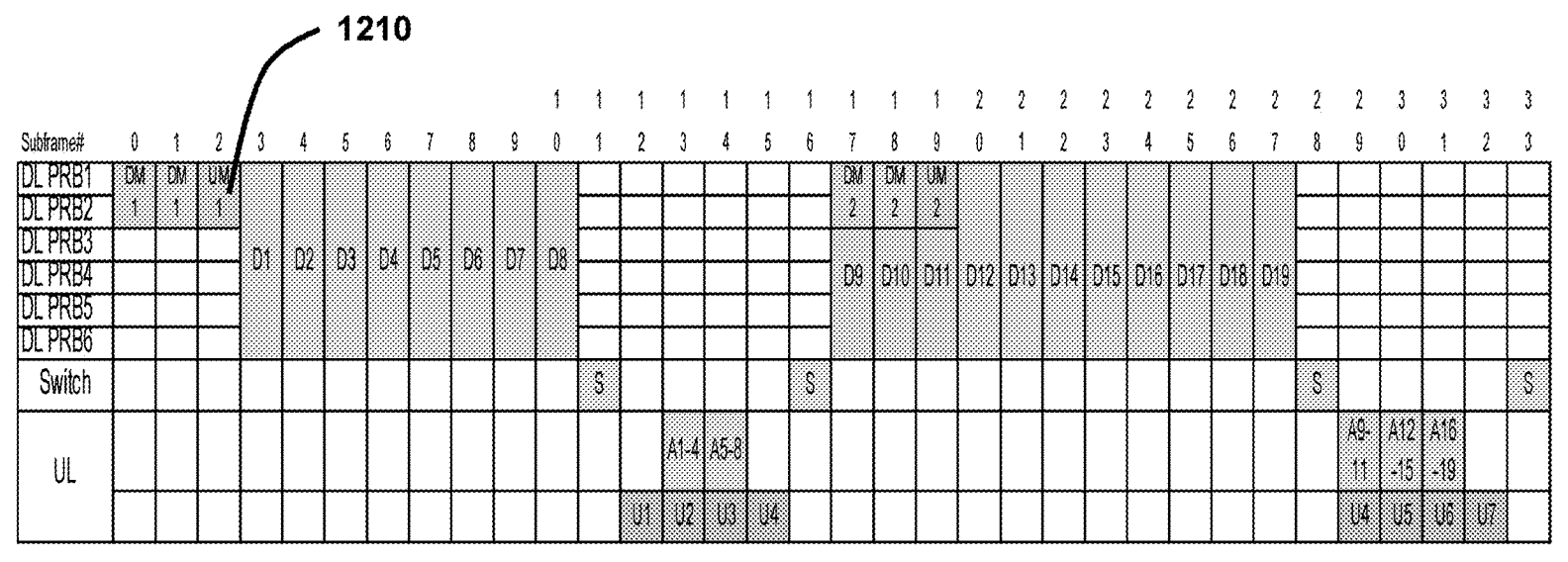

In some embodiments, the MTBG scheduling can be enhanced for mixed UL and DL traffic by supporting variably scheduled time delays between UL MTBG and UL data transmission on physical data channel (e.g. PUSCH), as is illustrated in FIG. 12 below. If the delay between UL MTBG and UL data transmission on PUSCH is fixed, UL traffic would not be available when all 6 PRBs are scheduled with a DL MTBG. However, even if there is no UL user plane data, there is always some UL signalling. For example, when the radio link control (RLC) layer sends RLC-ACKs in the UL, some UL traffic needs to be scheduled. This issue may be resolved by a new UL MTBG grant (e.g. a new DCI bit) that specifies the delay between the UL MTBG and the UL data transmission. For this, an extra 1 bit in MTBG would be needed.

FIG. 12 illustrates mixed DL-UL data transmission using MTBG with variable delay, in accordance with embodiments of the present disclosure. Referring to FIG. 12, the UM 1210, UL MTBG in subframe 2, may have a variable delay. For instance, similar to the example shown in FIG. 11, the UM 1210 may have a delay of 10 SFs to the PUSCH as opposed to the normal delay of 4 SFs. This mixed DL-UL MTBG data transmission with variable delay may allow 6 PRBs to be scheduled in the DL and also allow UL traffic within the same HARQ cycle to support bi-directional traffic more effectively.

Figure 13:
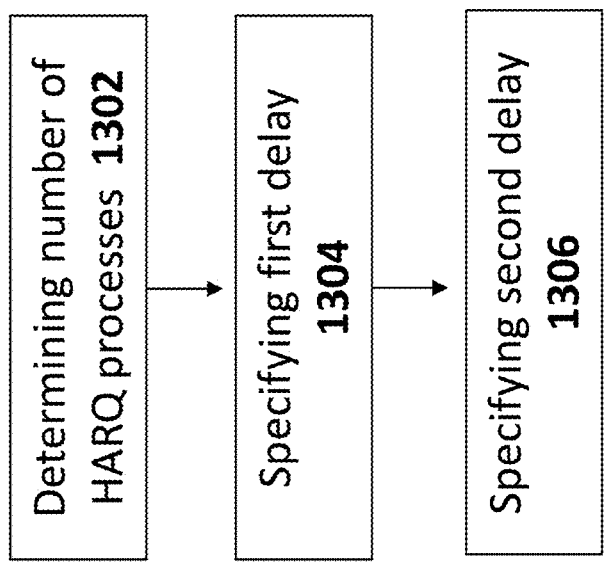
FIG. 13 illustrates a method for supporting data transmissions using MTBG in a wireless communication system, in accordance with embodiments of the present disclosure.

FIG. 13 illustrates a method for supporting data transmissions using MTBG in a wireless communication system, in accordance with embodiments of the present disclosure. The method includes determining 1302 a number of hybrid automatic repeat request (HARQ) processes in a HARQ cycle. Upon determination that the number of HARQ processes is greater than 8 and the HARQ processes are divided into two or more HARQ process groups, the method further includes specifying 1304 a first delay indicative of time between transmission of a MTBG and commencement of a data transmission. The method further includes specifying 1306 a second delay indicative of time between the data transmission and receipt of an acknowledgement (ACK).

According to some embodiments, the first delay and the second delay are explicitly specified in a downlink control information (DCI) transmission. According to some embodiments, the time between the ACK and a next MTBG for a next HARQ cycle is at least in part indicative of a number of HARQ processes in the next HARQ cycle. According to some embodiments, the HARQ process group associated with the MTBG at least in part indicative of the first delay and the second delay. According to some embodiments, the data transmission is a downlink data transmission. According to some embodiments, the data transmission is an uplink data transmission. According to some embodiments, the number of HARQ processes in a HARQ cycle is 14 or 16.

Figure 14:
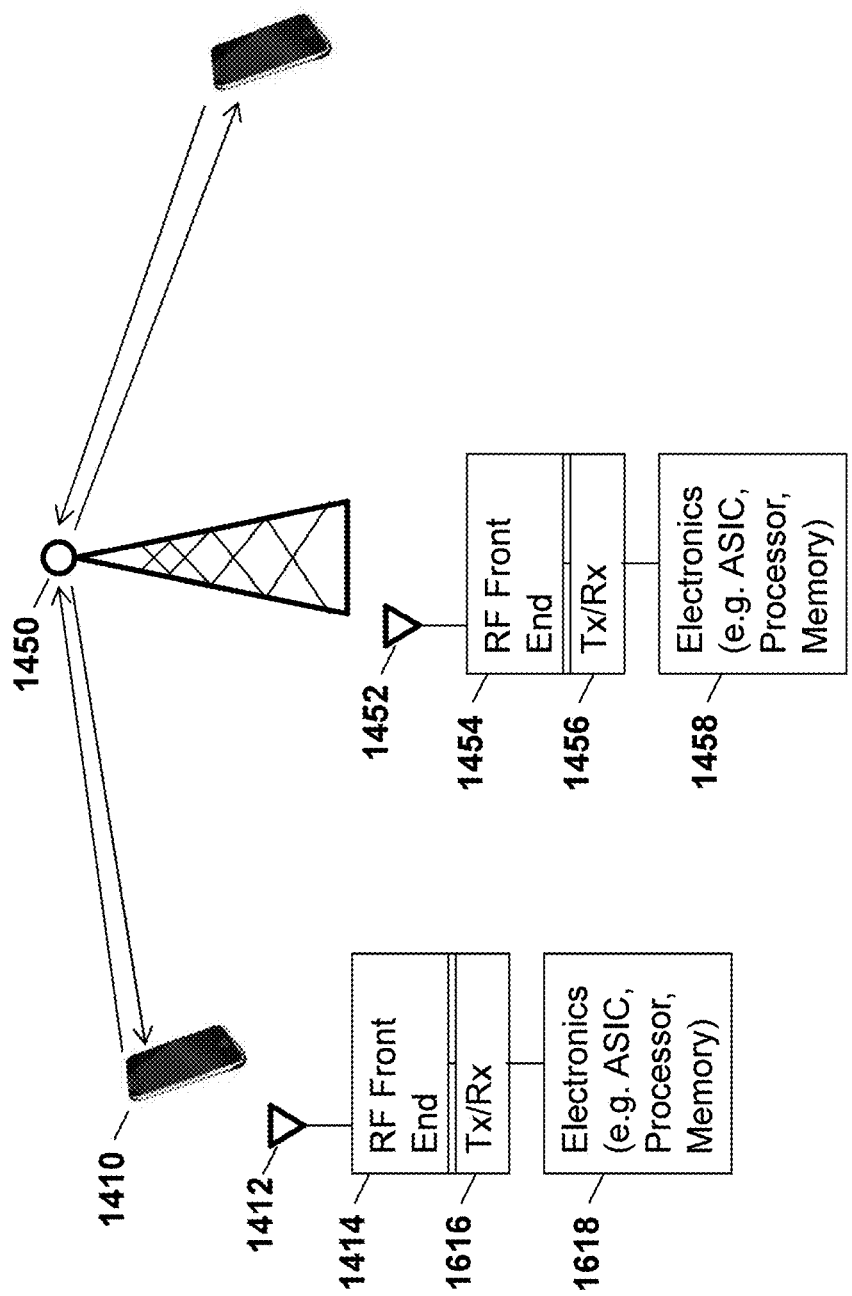
FIG. 14 illustrates a UE and a RAN infrastructure device (e.g. eNB, gNB) of a wireless communication network, in accordance with embodiments of the present disclosure.

FIG. 14 illustrates a UE 1410 and a RAN infrastructure device 1450 (eNB/gNB) of a wireless communication network, in accordance with an embodiment of the present invention. The UE 1410 includes an antenna 1412, a RF Front end 1414, a RF transmitter and receiver 1616, and supporting electronics 1618 such as but not necessarily limited to: digital circuitry such as application specific integrated circuits (ASIC), a computer processor and a memory. The memory can include program instructions for execution by the processor in order to cause the UE 1410 to operate as described herein, for example to perform the methods described previously. The RAN infrastructure device 1450 similarly includes an antenna 1452, a RF Front end 1454, a RF transmitter and receiver 1456, and supporting electronics 1458 such as but not necessarily limited to: digital circuitry such as application specific integrated circuits (ASIC), a computer processor and a memory. The memory can include program instructions for execution by the processor in order to cause the RAN infrastructure device 1450 to operate as described herein, for example to perform the methods described previously.

It will be understood that the term "RAN infrastructure device" "base station" or "base transceiver station (BTS)" may refer to an evolved NodeB (eNB), New Radio (NR) or next generation NodeB (e,g, gNodeB or gNB), a radio access node, or another device in a wireless communication network infrastructure, such as an LTE infrastructure or 5G/NR infrastructure, which performs or directs at least some aspects of wireless communication with wireless communication devices. The term "terminal" or "UF" refers to a device, such as a mobile device, MTC device, or other device, which accesses the wireless communication network infrastructure via wireless communication with a base station.

It will be appreciated that, although specific embodiments of the technology have been described herein for purposes of illustration, various modifications may be made without departing from the scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server. PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for supporting multi-transport block grant (MTBG) data transmissions in a wireless communication system, the method comprising:
   determining a number of hybrid automatic repeat request (HARQ) processes in a HARQ cycle;
   upon determination that the number of HARQ processes is greater than 8 and the HARQ processes are divided into two or more HARQ process groups, specifying a first delay indicative of time between transmission of a MTBG and commencement of a data transmission; and
   specifying a second delay indicative of time between the data transmission and receipt of an acknowledgement (ACK).

2. The method of claim 1, wherein the first delay is explicitly specified in the MTBG.

3. The method of claim 1, wherein the second delay is explicitly specified in the MTBG.

4. The method of claim 1, wherein a time between the ACK and a next MTBG for a next HARQ cycle is at least in part indicative of a number of HARQ processes in the next HARQ cycle.

5. The method of claim 1, wherein the HARQ process group associated with the MTBG at least in part indicative of the first delay and the second delay.

6. The method of claim 1, wherein the data transmission is a downlink data transmission.

7. The method of claim 1, wherein the data transmission is an uplink data transmission.

8. The method of claim 1, wherein the number of HARQ processes in a HARQ cycle is 14 or 16.

9. A user equipment (UE) comprising:
   a processor; and
      machine readable memory storing machine executable instructions which when executed by the processor configure the UE to:
      receive a multi-transport block grants (MTBG), the MTBG including information indicative of:
         a number of hybrid automatic repeat request (HARQ) processes in a HARQ cycle, the HARQ processes being divided into two or more HARQ process groups when the number of HARQ processes is greater than 8;
         a first delay indicative of time between transmission of a MTBG and commencement of a data transmission; and
         a second delay indicative of time between the data transmission and receipt of an acknowledgement (ACK); and
      the instructions which when executed by the processor further configure the UE to transmit data in accordance with the information.

10. The UE of claim 9, wherein one or more of the first delay and the second delay are explicitly specified in the MTBG.

11. The UE of claim 9, wherein a time between the ACK and a next MTBG for a next HARQ cycle is at least in part indicative of a number of HARQ processes in the next HARQ cycle.

12. The UE of claim 9, wherein the HARQ process group associated with the MTBG at least in part indicative of the first delay and the second delay.

13. The UE of claim 9, wherein the data transmission is a downlink data transmission or an uplink data transmission.

14. The UE of claim 9, wherein the number of HARQ processes in a HARQ cycle is 14 or 16.

15. A base station comprising:
   a processor; and
   machine readable memory storing machine executable instructions which when executed by the processor configure the base station to:
      transmit a multi-transport block grant (MTBG), the MTBG including information indicative of:
         a number of hybrid automatic repeat request (HARQ) processes in a HARQ cycle, the HARQ processes being divided into two or more HARQ process groups when the number of HARQ processes is greater than 8;
         a first delay indicative of time between the MTBG and commencement of a data transmission, and
         a second delay indicative of time between the data transmission and transmission of an acknowledgement (ACK); and
      the instructions which when executed by the processor further configure the base station to receive data in accordance with the information.

16. The base station of claim 15, wherein one or more of the first delay and the second delay are explicitly specified in the MTBG.

17. The base station of claim 15, wherein a time between the ACK and a next MTBG for a next HARQ cycle is at least in part indicative of a number of HARQ processes in the next HARQ cycle.

18. The base station of claim 15, wherein the HARQ process group associated with the MTBG at least in part indicative of the first delay and the second delay.

19. The base station of claim 15, wherein the data transmission is a downlink data transmission or an uplink data transmission.

20. The base station of claim 15, wherein the number of HARQ processes in a HARQ cycle is 14 or 16.

\* \* \* \* \*